United States Patent
Lee et al.

(10) Patent No.: US 9,974,422 B2
(45) Date of Patent: May 22, 2018

(54) ROBOT CLEANER AND METHOD FOR CONTROLLING A ROBOT CLEANER

(71) Applicant: LG Electronics Inc., Seoul (KR)

(72) Inventors: Haesoo Lee, Seoul (KR); Seunghoe Choe, Seoul (KR); Kangyoul Lee, Seoul (KR); Weonho Bae, Seoul (KR); Minjung Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 634 days.

(21) Appl. No.: 14/466,041

(22) Filed: Aug. 22, 2014

(65) Prior Publication Data
US 2015/0052703 A1    Feb. 26, 2015

(30) Foreign Application Priority Data

Aug. 23, 2013 (KR) .......................... 10-2013-0100552
Aug. 23, 2013 (KR) .......................... 10-2013-0100603

(51) Int. Cl.
| A47L 9/28 | (2006.01) |
| B25J 9/00 | (2006.01) |
| G05D 1/02 | (2006.01) |

(52) U.S. Cl.
CPC ........... *A47L 9/2805* (2013.01); *A47L 9/2815* (2013.01); *A47L 9/2852* (2013.01); *A47L 9/2894* (2013.01);
(Continued)

(58) Field of Classification Search
CPC .... A47L 9/2805; A47L 9/2815; A47L 9/2852; A47L 9/2894; A47L 2201/04–2201/06;
(Continued)

(56) References Cited

U.S. PATENT DOCUMENTS

| 6,459,955 B1 * | 10/2002 | Bartsch ..................... A47L 9/00 318/568.11 |
| 2005/0096790 A1 * | 5/2005 | Tamura .................. G06N 3/008 700/245 |

(Continued)

FOREIGN PATENT DOCUMENTS

| CN | 101152064 | 4/2008 |
| CN | 101515197 | 8/2009 |

(Continued)

OTHER PUBLICATIONS

Korean Office action issued in Application No. 10-2013-0100552 dated Oct. 23, 2014.
(Continued)

*Primary Examiner* — Bao Long T Nguyen
(74) *Attorney, Agent, or Firm* — Ked & Associates LLP

(57) ABSTRACT

A robot cleaner having a monitoring function and minimizing power consumption and/or securing communication efficiency and a method of controlling a robot cleaner are provided. The robot cleaner may include at least one sound obtaining device; at least one image obtaining device; and a controller configured to determine whether a sound obtained through the at least one sound obtaining device is abnormal, sense a direction in which an abnormal sound is generated, and obtain images in the direction in which the abnormal sound is generated. The robot cleaner may automatically recognize a surrounding situation, and when necessary, the robot cleaner may rotate and/or move in a corresponding direction and/or position to obtain images or transmit the obtained images to a remote terminal, thereby minimizing power consumption of the robot cleaner with limited power.

15 Claims, 18 Drawing Sheets

(52) U.S. Cl.
CPC .......... *B25J 9/0003* (2013.01); *G05D 1/0231* (2013.01); *G05D 1/0246* (2013.01); *G05D 1/0255* (2013.01); *A47L 2201/04* (2013.01); *G05D 2201/0203* (2013.01); *Y10S 901/01* (2013.01); *Y10S 901/46* (2013.01); *Y10S 901/47* (2013.01)

(58) Field of Classification Search
CPC ...... A47L 9/009; B25J 9/0003; G05D 1/0231; G05D 1/0246; G05D 1/0255; G05D 2201/0203; Y10S 901/01; Y10S 901/46; Y10S 901/47; G05B 2219/40543
USPC ...... 700/245, 250, 253, 258, 259; 901/1, 46, 901/47; 318/568.12, 568.16
See application file for complete search history.

(56) References Cited

U.S. PATENT DOCUMENTS

| 2005/0120505 | A1 | 6/2005 | Tani | |
| 2006/0004486 | A1* | 1/2006 | Yoshikawa | B60W 50/14 700/245 |
| 2006/0079998 | A1* | 4/2006 | Yoshikawa | B25J 19/021 700/245 |
| 2007/0192910 | A1* | 8/2007 | Vu | B25J 5/007 700/245 |
| 2010/0076600 | A1 | 3/2010 | Cross et al. | |
| 2013/0184867 | A1* | 7/2013 | Jang | B25J 9/163 700/253 |
| 2013/0232717 | A1* | 9/2013 | Lee | G05D 1/0255 15/319 |

FOREIGN PATENT DOCUMENTS

| JP | 2002-321180 A | 11/2002 |
| KR | 10-2001-0083059 A | 8/2001 |
| KR | 10-2002-0088880 A | 11/2002 |
| KR | 10-2009-0116089 A | 11/2009 |
| WO | WO 2013/085085 | 6/2013 |

OTHER PUBLICATIONS

European Search Report dated Mar. 18, 2015.
Chinese Office Action dated Jan. 23, 2007 (English Translation).
Chinese Office Action dated Jul. 3, 2017 issued in Application No. 201410414911.9 (with English Translation).

* cited by examiner

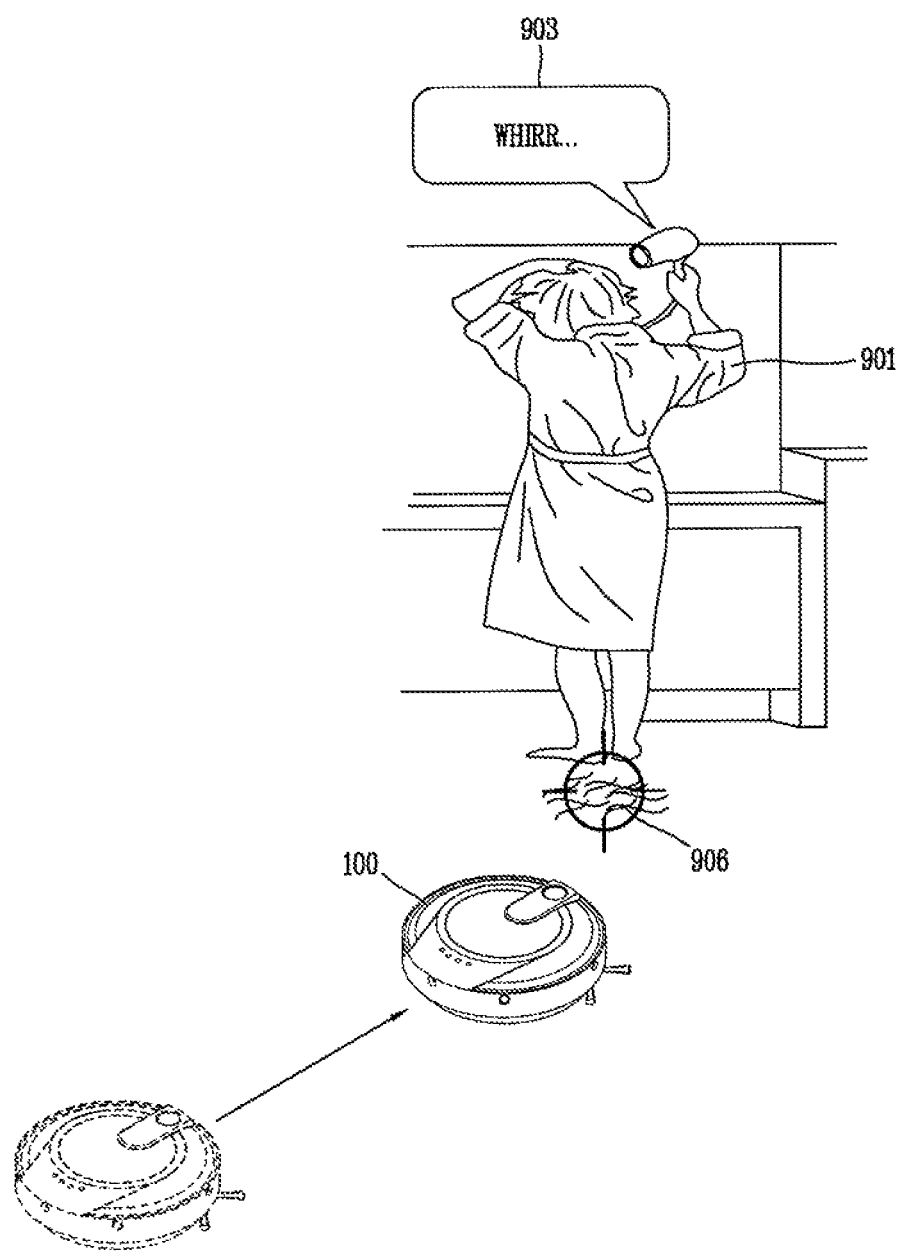

ROBOT CLEANER AND METHOD FOR CONTROLLING A ROBOT CLEANER

CROSS-REFERENCE TO RELATED APPLICATION(S)

Pursuant to 35 U.S.C. § 119(a), this application claims priority to Korean Application Nos. 10-2013-0100552 and 10-2013-0100603 both filed in Korea on Aug. 23, 2013, the contents of which is incorporated by reference herein in its entirety.

BACKGROUND

1. Field

A robot cleaner and a method for controlling a robot cleaner are disclosed herein.

2. Background

In general, robots initially developed for industrial purposes have played a key part in factory automation. Recently, application fields of robots have been further extended to include medical robots, aerospace robots, and even home robots that may be used in homes have also been produced.

A typical example of a home robot is a robot cleaner. A robot cleaner is a type of electronic device capable of sucking in ambient dust or foreign objects, while moving in a predetermined area. Recently, robot cleaners including various functions in addition to a basic cleaning function as mentioned above have been developed, and robot cleaners equipped with a monitoring function to monitor a predetermined area and sense an abnormal situation have been introduced.

For example, a robot cleaner, which may be positioned in a particular spot within a predetermined area, capture four images, while rotating at a current location by about 90 degrees each time, and deliver the same to a previously registered remote terminal has been presented. However, although an installed battery of the robot cleaner has limited power, the robot cleaner may continuously rotate and capture images, causing a large amount of power consumption, and as the robot cleaner continuously transmits captured images to a remote terminal, there is a problem in terms of communication efficiency of the robot cleaner.

Meanwhile, in a case in which a robot cleaner performs cleaning in an area to be cleaned (or a cleaning area) according to a user command or a pre-set schedule, continuously performing cleaning on the entire cleaning region by the robot cleaner with limited power may inevitably frequently move from a current location to a charging station, causing a problem in terms of power consumption.

Thus, a technique capable of addressing the foregoing problems is urgently required.

BRIEF DESCRIPTION OF THE DRAWINGS

Embodiments will be described in detail with reference to the following drawings in which like reference numerals refer to like elements, and wherein.

DETAILED DESCRIPTION

Hereinafter, the embodiments will be described with reference to the accompanying drawings, in which like numbers refer to like elements throughout although the embodiments are different, and repetitive description has been omitted. In the following description, usage of suffixes, such as 'module', 'part', or 'unit' used for referring to elements is given merely to facilitate explanation, without having any significant meaning by itself. In describing embodiments, if a detailed explanation for a related known function or construction is considered to unnecessarily divert the gist, such explanation has been omitted but would be understood by those skilled in the art. The accompanying drawings aim to facilitate understanding and should not be construed as limited to the accompanying drawings.

Figure 1:
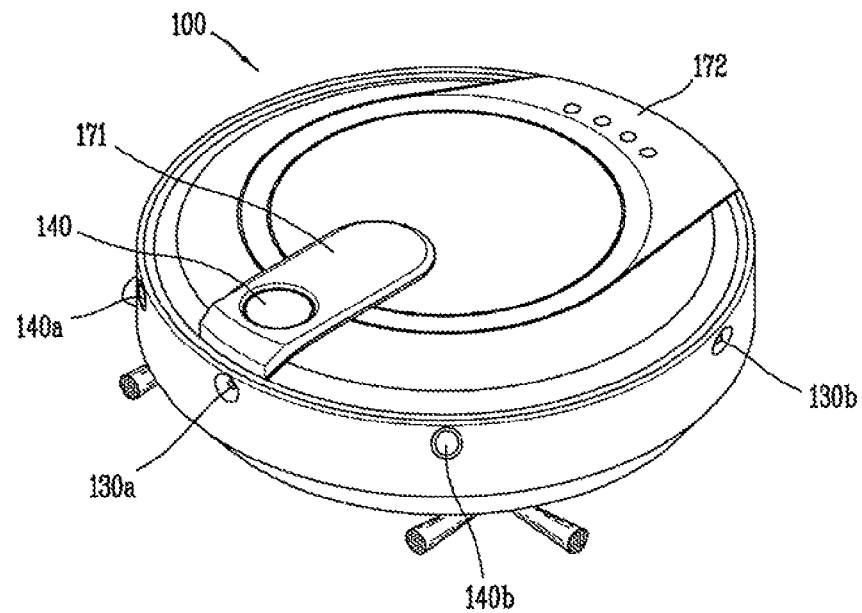
FIG. 1 is a perspective view of a robot cleaner according to an embodiment.
Figure 2:
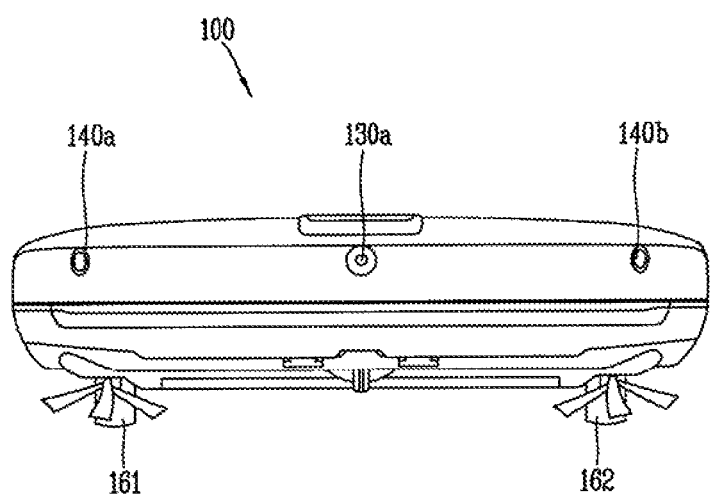
FIG. 2 is a front view of the robot cleaner of FIG. 1.
Figure 3:
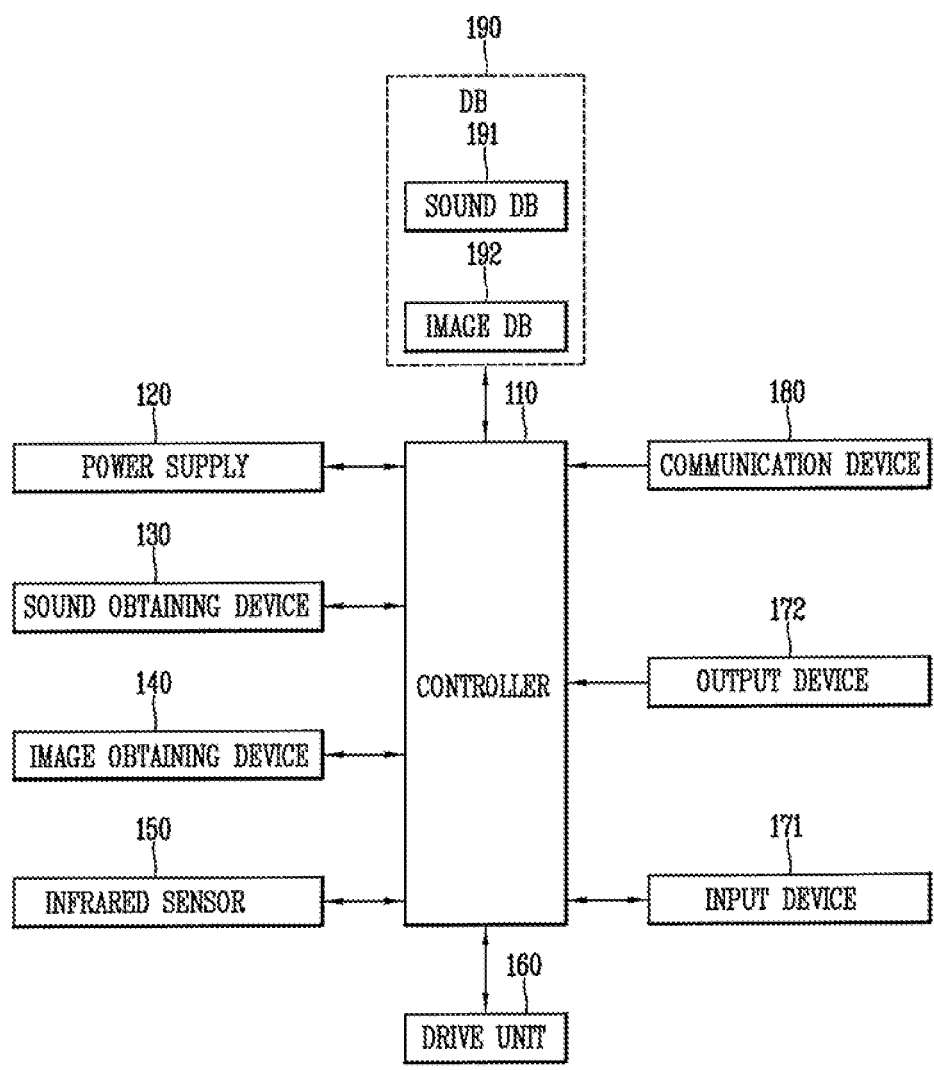
FIG. 3 is a block diagram of the robot cleaner of FIG. 1.

FIG. 1 is a perspective view of a robot cleaner according to an embodiment. FIG. 2 is a front view of the robot cleaner of FIG. 1. FIG. 3 is a block diagram of the robot cleaner of FIG. 1.

As illustrated in FIGS. 1 through 3, a robot cleaner 100 according to an embodiment may include a controller 110, a power supply 120, at least one sound obtaining device 130, at least one image obtaining device 140, an infrared sensor 150, a drive 160, an output 171, an input 172, a communication device 180, and a database (DB) 190. Here the DB 190 may include either a sound DB 191 or an image DB 192.

The components illustrated in FIG. 3 are not all essential, and the robot cleaner may be implemented with greater or fewer components. Hereinafter, each component will be described.

The robot cleaner 100 may include a cleaning device (not shown) to perform cleaning by sucking in dust or foreign objects. The cleaning device may include a dust container to store collected dust, a suction fan to provide drive power to suck in dust in an area to be cleaned (or a cleaning area), and a suction motor to suck air by rotating the suction fan, to thereby suck in ambient dust or foreign objects. In this case, the robot cleaner may further include the drive 160 (please refer to FIG. 3) to move or travel by itself, whereby the robot cleaner may perform a cleaning function by autonomously moving in the cleaning area.

As illustrated in FIG. 2, the robot cleaner 100 may have first and second main wheels 161 and 162 for movement. The drive 160 may be connected to the first and second main wheels 161 and 162 and include a predetermined wheel motor to rotate the main wheels 161 and 162. By driving the wheel motor, the body of the robot cleaner may be rotated or moved. Alternatively, a plurality of wheel motors may be provided and connected to the main wheels 161 and 162, respectively. The plurality of wheel motors may independently operate to individually control the main wheels 161 and 162, respectively.

The robot cleaner 100 may further include one or more auxiliary wheels on a rear surface thereof. The one or more auxiliary wheels may support the body of the robot cleaner 100 and minimize frictional abrasion between a lower surface of the body and a floor to allow the robot cleaner 100 to smoothly move.

Handles may be installed in or at edges of a lower portion of the body of the robot cleaner, for example, in or at both sides of the main wheels 161 and 162, to allow a user to easily grasp the handles.

The robot cleaner 100 may further include the input 172, which may receive a control command, and/or the output 171. As illustrated in FIG. 1, in order to directly receive a control command from a user, the input 172 may include hard keys, soft keys, or a touch pad (including a touch screen having a display function), for example. On the other hand, utilizing the at least one sound obtaining drive 130 and/or the sound DB 191, the controller 110 may receive various inputs through a voice input from the outside by applying various algorithms having a known word recognition function.

Through the input 172, the robot cleaner 100 may receive information required to perform various functions in the robot cleaner, such as a cleaning function, or a monitoring function, for example. In detail, through the input 172, time information required to perform a cleaning function based on a pre-set schedule, or information regarding a cleaning area, for example, may be received; a command for direct traveling to front, rear, left, and right sides (in front, rear, left, and right directions), returning to a charging station, or moving to a particular cleaning area, for example, may be received; a command for outputting information stored in various internal storages may be received; or a command for setting or changing various functions, such as a cleaning mode, a travel mode (horizontal traveling, vertical traveling, or zigzag traveling, for example) of the robot cleaner, may be received.

The output 171 may be a means to provide various types of information to a user by the robot cleaner 100. The output 171 may be installed in various forms in various positions. However, as illustrated in FIG. 1, in order to allow the user to easily recognize various types of information output from the robot cleaner at an eye level of the user, the output 171 may be installed to be exposed from an upper portion of the robot cleaner. The output 171 may display, for example, a current state of each component of the robot cleaner, reserved information, a battery state, a cleaning mode and/or traveling mode state, cleaning area information, obstacle information, position information, image information, movement information, or estimated movement path, for example. The aforementioned information may be displayed on map information.

Meanwhile, the robot cleaner 100 may further include an operation sensor (not shown) that senses an operation and/or a current state of the robot cleaner 100 according to driving of the body thereof and outputting corresponding information. The operation sensor may use a gyro sensor, a wheel sensor, or an accelerometer, for example, to sense an operation and/or a state of the robot cleaner 100. The operation sensor may be implemented to perform the same function in the controller 110 or may be implemented as a separate component physically independent from the controller 110; however, embodiments are not limited thereto.

A gyro sensor may sense a rotational direction when the robot cleaner 100 moves, and detect a rotational angle. In detail, the gyro sensor may detect an angular velocity of the robot cleaner 100 and output a voltage or current value in proportion to the angular velocity. The operation sensor may sense a rotational direction and a rotational angle using the voltage or current value output from the gyro sensor.

A wheel sensor may be connected to the main wheels 161 and 162 to sense a number of rotations of the main wheels. The wheel sensor may be a rotary encoder. The rotary encoder may sense a number of rotations of the first and/or second main wheels and output the same. The operation sensor may calculate rotational speeds of the first and second wheels using the number of rotations, and also, the operation sensor may calculate a rotational angle of the robot cleaner 100 using a difference in number of rotations of the first and second wheels.

An accelerometer may sense a change in a speed of the robot cleaner 100. For example, the accelerometer may sense a change in a movement speed of the robot cleaner 100 according to a start, a stop, a change in direction or a collision with an object, for example. The accelerometer may be attached to a position adjacent to the main wheels or the auxiliary wheel to detect sliding of the wheels or idle rotation. Also, the accelerometer may be installed in the operation sensor to sense a change in speed of the robot cleaner. Namely, the accelerometer may detect impulse according to a change in speed and output a corresponding voltage or current value. Thus, the accelerometer may serve as an electronic bumper.

On the basis of operation information output from the operation sensor, the controller 110 may calculate a change in position of the robot cleaner, and the robot cleaner 100 may calculate a relative position using the position information. The robot cleaner 100 may calculate an absolute position by comparing feature points, or obstacle information, for example, extracted from an image obtained by the at least one image obtaining device 140 with a previously stored image.

The robot cleaner 100 according to this embodiment may include the at least one the sound obtaining device 130. The at least one sound obtaining device 130 may be a means for receive a sound and converting the received sound into an electrical signal. The at least one sound obtaining device 130 may be a means to obtain a sound generated from the outside.

The at least one sound device 130 may include a plurality of sound obtaining devices 130a, 130b, 130c provided outside of the robot cleaner 100, so that the controller 110 may recognize a direction of a sound generated in the outside. In a case in which a sound is obtained through the plurality of sound obtaining devices 130a, 130b, 130c, a direction in which an external sound is generated may be sensed. In detail, among the plurality of sound obtaining devices 130a, 130b, 130c, a single sound obtaining device having a sound wave with a highest sound pressure may be determined, and a direction in which an external sound has been generated may be detected based on a position of the robot cleaner 100 in which the determined sound obtaining device is disposed.

The plurality of sound obtaining devices 130a, 130b, 130c may be disposed on a lateral outer circumferential surface of the robot cleaner 100, in directions in which they have high sensitivity with respect to received sound waves, and here, in consideration of an angle of view of the image obtaining device 140 and costs incurred according to the number of sound obtaining devices, for example, three sound obtaining devices may be disposed at a same angle on the lateral outer circumferential surface of the robot cleaner 100. For example, the three sound obtaining devices may be disposed at an angle of about 120° between two adjacent sound obtaining devices based on a center of the robot cleaner 100.

The robot cleaner 100 may include the at least one image obtaining device 140. The at least one image obtaining device 140 may be a means including an image sensor that converts light received from the outside into an electrical signal to obtain an image. The robot cleaner 100 may image surroundings using the at least one image obtaining device 140 to obtain images. The at least one image obtaining device 140 may include at least one lens (not shown) that receives light reflected from a subject, an adjusting device that adjusts a distance between lenses or a distance between a lens and the image sensor, for example.

As illustrated in FIG. 1, at least one image obtaining device 140*c* may be installed on a front portion of the robot cleaner 100 or an upper portion (for example, the position of reference numeral 171) of the robot cleaner 110 to obtain images of surroundings of the robot cleaner 100. When the robot cleaner 100 further includes image obtaining devices 140*a* and 140*b*, the image obtaining devices 140*a* and 140*b* may be disposed on the lateral outer circumferential surface of the robot cleaner 100 at a predetermined distance or at a predetermined angle.

For example, the image obtaining devices 140*a* and 140*b* may be disposed on a front surface or at a position adjacent to the sound obtaining device 130*a* in order to obtain an image of a front side thereof while on the move, or may be disposed at first and second sides (please refer to FIGS. 1 and 2) of the sound obtaining device 130*a* based on the position of the sound obtaining device 130*a* in order to capture images with respect to the direction in which the sound obtaining device 130*a* is positioned without omission in consideration of an angle of view of the lenses included in the image obtaining device 140.

The sound DB 191 may store various daily life noise as sounds. In this case, the sound DB 191 may classify the stored sounds into abnormal sounds and store the same. For example, various types of noise, such as a sound generated as various objects are dropped or broken, a sound generated as glass is broken, a sound generated when a drill rotates, a sound of a dog barking, an alarm sound generated by and a warning device, for example, from various sensors, indicating a situation in which there is a trespasser, may be stored as abnormal sounds, and conversely, various types of noise that may be generated irrespective of a trespass, such as noise generated from an interior of the robot cleaner 100, and noise generated by home appliances, such as a refrigerator, a washing machine, or a water purifier, for example, may be stored as non-abnormal sounds.

As the sound DB 190, a non-volatile memory (NVM) that continuously maintaining information stored therein even without power supply thereto may be used. For example, the sound DB 190 may include a ROM, a flash memory, a magnetic computer storage device (for example, a hard disk, a diskette drive, a magnetic tape), or an optical disk drive, for example, and also may include a magnetic RAM, or a PRAM, for example, as well as a punched card and a paper tape.

Alternatively, it may be connected to an external server (not shown) storing various sounds using the communication device 180, transmit a received sound to the external server 300, and receive analysis information from the external server (not shown).

The controller 110 may be a means to control the robot cleaner 100 or a general operation of each of the components. The controller 110 may determine whether a sound obtained through the at least one sound obtaining device 130 is abnormal, sense a direction in which an abnormal sound has been generated, and obtain an image of the direction in which an abnormal sound has been generated through the at least one image obtaining device.

Whether a sound obtained by the at least one sound obtaining device 130 is an abnormal sound may be determined through various known means or methods. In one embodiment, when a sound is obtained through the at least one sound obtaining device 130, a sound identical to or most similar to the sound obtained by the at least one sound obtaining device 130 may be retrieved from sounds stored in the sound DB 191, and whether the retrieved sound is an abnormal sound may be determined. In this case, similarity between the sound obtained by the at least one sound obtaining device 130 and the sound stored in the sound DB 191 may be calculated to determine whether the sounds are identical and/or similar.

Figure 6:
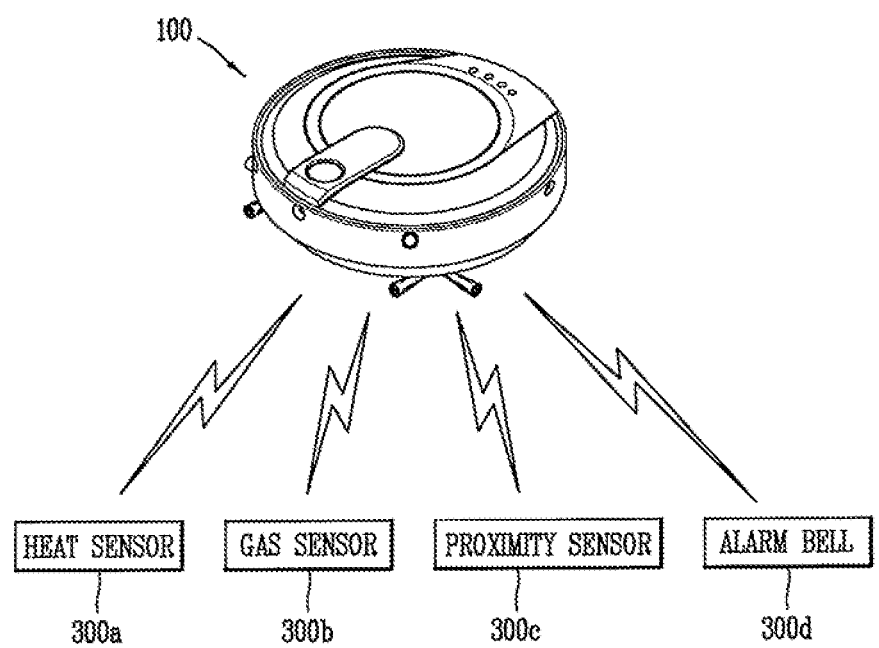
FIG. 6 is a schematic diagram illustrating an example of monitoring using a robot cleaner according to an embodiment.

For example, as illustrated in FIG. 6, when a heat sensor 300*a*, a gas sensor 300*b*, or a proximity sensor 300*c* senses a temperature higher than a predetermined temperature level, senses a gas leak, or a trespasser, and generates an alarm sound, the controller 110 may compare the alarm sound obtained by the sound obtaining device 130 with sounds stored in the sound DB 191 to determine whether the alarm sound is an abnormal sound and a current situation is abnormal. Also, in a case in which a current situation is determined to be abnormal or in a case in which a doorbell is sounded through an alarm bell 300*d* by a visitor in a cleaning area, the controller 110 may compare it with the sounds stored in the sound DB 191 and determine whether a current situation is abnormal (a visitor is present in the cleaning area).

In this case, in order for the controller 110 to determine whether an obtained sound is abnormal, the obtained sound may be compared with only sounds that have been filtered out because they have sound pressure equal to or greater than a predetermined level, among sounds obtained by the at least one sound obtaining device 130. That is, a sound wave introduced from the outside, rather than from within the cleaning area, may be excluded from determination as to whether it is abnormal in advance. For example, in a case in which sound pressure of a sound wave obtained through the at least one sound obtaining device 130 in a normal situation, rather than in an abnormal situation, ranges from about 40 db to 45 db, 55 db may be determined as a reference level, whereby a sound recognition rate equal to or higher than about 90% may be obtained.

Figure 5:
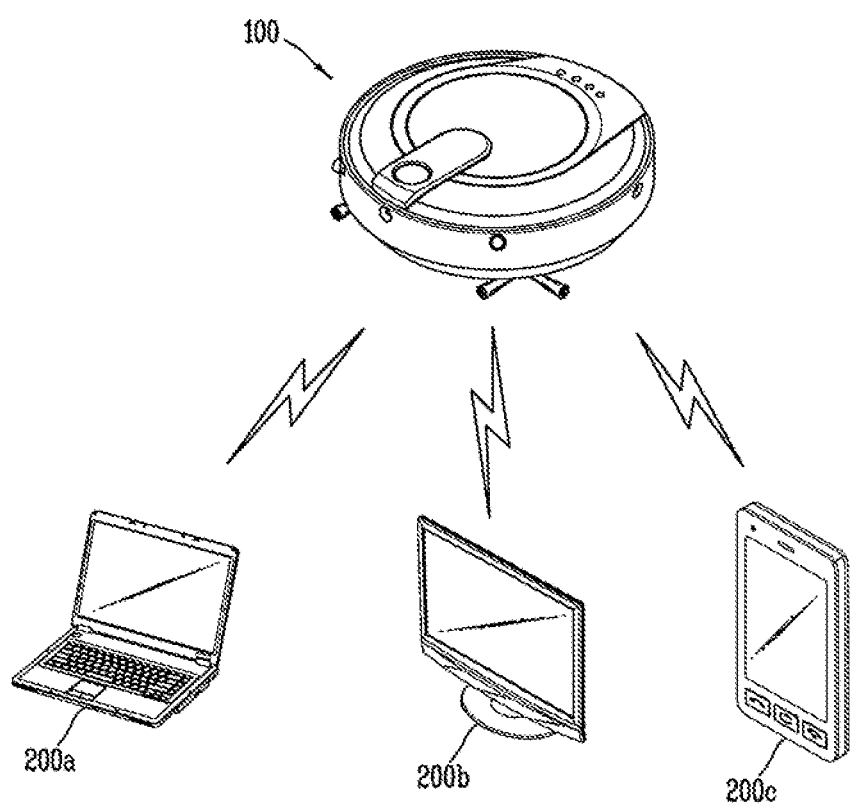
FIG. 5 is a schematic diagram of a remote monitoring system including a robot cleaner according to an embodiment.

As described above, when the controller 110 determines that a sound obtained through the at least one sound obtaining device 130 is abnormal, the robot cleaner 100 may determine that a current situation is abnormal, and transmit an alarm signal to a remote terminal or a server through the communication device 180. As illustrated in FIG. 5, the robot cleaner 100 may transmit an alarm signal to at least one terminal 200, such as a computer 200*a*, a smart TV 200*b*, or a smartphone or a mobile terminal 200*c*, for example, to warn a remote user about the abnormal situation. In this case, the robot cleaner 100 may be directly connected to the terminal 200 to transmit and receive data to and from the terminal 200, or may transmit and receive data to and from the terminal 200 through at least one server (not shown) to which a heterogeneous network is connected. In this case, the controller 110 may transmit a sound obtained through the at least one sound obtaining device 130 together with the alarm signal to the remote terminal or a server to provide the same to the user, whereby the user may determine whether a current abnormal situation is an urgent situation.

In addition to the direction in which the abnormal sound has been generated, the controller 100 may also recognize a sound source (or a starting place of a sound) from which the abnormal sound has been generated. Namely, as described above, the robot cleaner 100 may rotate or move through the drive 160 in the direction in which the abnormal sound is generated, and in this case, in order to accurately calculate a movement target point, for example, a sound source from which the abnormal sound has been generated needs to be recognized.

The sound source may be recognized through various known means or methods. In one embodiment, the controller 110 may recognize the sound source by estimating a distance to the sound source from which the abnormal sound has been generated, based on sound pressure of a sound wave obtained through the at least one sound obtaining device 130. Alternatively, the controller 110 may store at least one estimated sound generation point on a map corresponding to various sounds stored in the sound DB 191, and the controller 110 may recognize an estimated sound generation point corresponding to a direction in which the abnormal sound is generated, sensed through the at least one sound obtaining device 130, as a sound source.

Figure 4:
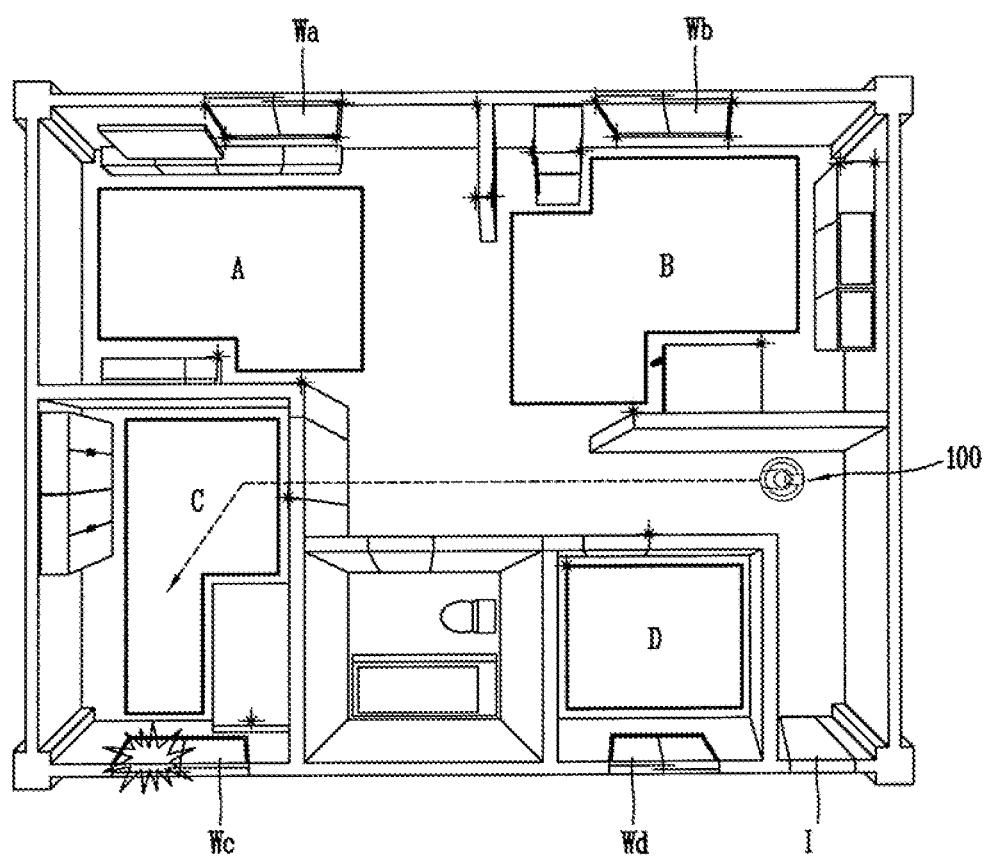
FIG. 4 is view illustrating operation of the robot cleaner of FIG. 1.

For example, as illustrated in FIG. 4, it is assumed that the user places the robot cleaner 100 in front of door I and goes out. When window Wc of room C, among rooms A, B, C, and D, is broken by a trespasser, the robot cleaner 100 may sense abnormal noise and recognize Wc, one of estimated points Wa, Wb, Wc, and Wd corresponding to a sound generated as the window is broken, as a sound source.

Thus, in the case in which the controller 110 recognizes a point (sound source) from which abnormal noise is generated, rather than the direction in which abnormal noise is generated, the robot cleaner 100 may move to the sound source to obtain images or may obtain images while on the move. In this manner, the robot cleaner 100 may move to the point from which abnormal sound has been generated, and provide a situation based on images to the remote terminal or a server through the communication device 180, whereby the user may determine the situation within a short time.

The controller 110 may obtain images in the direction in which the abnormal sound is generated or images of the sound source through the at least one image obtaining device 140 or obtain images while rotating or moving. In this case, the images obtained through the at least one image obtaining device 140 may be any of still, images and video. In the case of a plurality of still images continuously obtained while the robot cleaner 100 is being rotated, the controller 110 may process the still images into a single panoramic image, whereby although the at least one image obtaining device 140 includes a lens having a narrow angle of view, an image in a wider range without an omitted image may be obtained.

Thus, as described above, in the case in which the controller 110 determines that the sound obtained through the at least one sound obtaining device 130 is abnormal, the controller 110 may transmit the sound obtained through the at least one sound obtaining device 130 and/or the images obtained through the at least one image obtaining device 140 together when transmitting an alarm signal to the remote terminal or a server through the communication device 180, so as to be provided to the user.

Meanwhile, in order to increase accuracy of the determination of whether a current situation is an abnormal situation, the controller 110 may process an image obtained through the at least one image obtaining device 140 to determine whether a moving object is present. In one embodiment, the controller 110 may compare a plurality of continuous images to detect whether a moving object is present based on differences between images.

In order to increase accuracy of determination as to whether a current situation is an abnormal situation due to a trespasser, the controller 110 may sense a human body image or an animal image. The controller 110 may sense a human body image and an animal image of images by processing still images or video through various algorithms. In general, a monitoring function of the robot cleaner 100 may be operated when there is no person in a cleaning area. Thus, in a case in which the controller 110 senses a human body image within images obtained through the at least one image obtaining device 140, the controller 110 may determine that a current situation is abnormal, transmit the sound obtained through the at least one sound obtaining device 130 and/or the images (including the human body image) obtained through the at least one image obtaining device 140 to a remote terminal or a sever through the communication device 180. In the case of sensing an animal image, when a movement change speed of the image regarding the sensed animal (subject) is equal to or greater than a predetermined speed or when a sound obtained with respect to the sensed animal (subject) is equal to or greater than a predetermined level, the controller 110 may determine that a current situation is abnormal, and transmit the sound obtained through the at least one sound obtaining device 130 and/or the images (including the human body image) obtained through the at least one image obtaining device 140 to a remote terminal or a server through the communication device 180.

For example, it is assumed that there is no person in a cleaning area but a pet is present in the cleaning area. In a case in which the robot cleaner 100 determines that a current situation is abnormal based on a sensed image with respect to a pet, the determination is highly likely to be an erroneous determination. Instead, when a pet which discovers a trespasser hops and barks at the trespasser, the current situation may be determined as abnormal. Thus, when a movement change speed of a sensed animal image is faster or a sound pressure of a sound corresponding to the sensed animal image is equal to or higher than a predetermined level, the controller 110 may determine that the current situation is abnormal, thus reducing the possibility of an erroneous determination. In this case, a sound of barking of a pet is stored in advance in the sound DB 191, and only in the case of a sound equal to the stored sound or having similarity equal to or greater than a predetermined value, whether an input sound pressure is equal to or higher than a predetermined level may be determined to determine an abnormal situation.

Meanwhile, in order to obtain an image, the controller 110 may use the at least one image obtaining device 140. However, a continuous supply of power to the at least one image obtaining device 140 through the power supply 120 may result in a large amount of power consumption. Thus, the robot cleaner 100 according to this embodiment may further include an infrared sensor 150.

The infrared sensor 150 may sense infrared information of a target object using infrared rays and convert a physical or chemical quantity with respect to a temperature, for example, into an electrical signal. The infrared sensor 150 may be installed in a front portion or an upper portion of the robot cleaner 100 to sense a temperature of heat in a vicinity of the robot cleaner 100. When heat having a temperature equal to or higher than a predetermined temperature is sensed, the infrared sensor 150 may supply power to the at least one image obtaining device 140 to operate the at least one image obtaining device 140, thus reducing power consumption.

The controller 110 may control the infrared sensor 150 to be operated when a sound obtained through the at least one sound obtaining device 130 is determined to be abnormal, thus preventing additional power consumption that may be caused by the infrared sensor 150. Also, as described above, when the controller 110 determines that the sound obtained through the at least one sound obtaining device 130 is abnormal, the controller 110 may sense a direction in which the abnormal sound has been generated and obtain an image of the corresponding direction. In this case, in order to prevent the robot cleaner 100 from reacting to a non-abnormal sound and operate the at least one image obtaining device 140 to cause power consumption, a direction in which a sound is generated is sensed only when the sound is determined to be abnormal, and the robot cleaner 100 may rotate or move in the sensed direction to obtain images in the direction in which abnormal sound is generated.

The robot cleaner 100 may include the power supply 120. The power supply 120 may include a rechargeable battery to supply drive power to each component included in the robot cleaner 100.

The power supply 120 may supply power required for the robot cleaner 100 to travel or perform cleaning, and when remaining power capacity is insufficient, the robot cleaner 100 may move to a charging station or may receive power from an external power source connected thereto so as to be charged. The controller 110 may sense a charged state of the battery and compare the sensed remaining battery capacity with a pre-set or pre-determined reference battery value. When the remaining battery capacity is equal to or lower than the reference battery value, the controller 110 may move the robot cleaner 100 to the charging station through the drive 160 to allow the robot cleaner 100 to be recharged.

Figure 7:
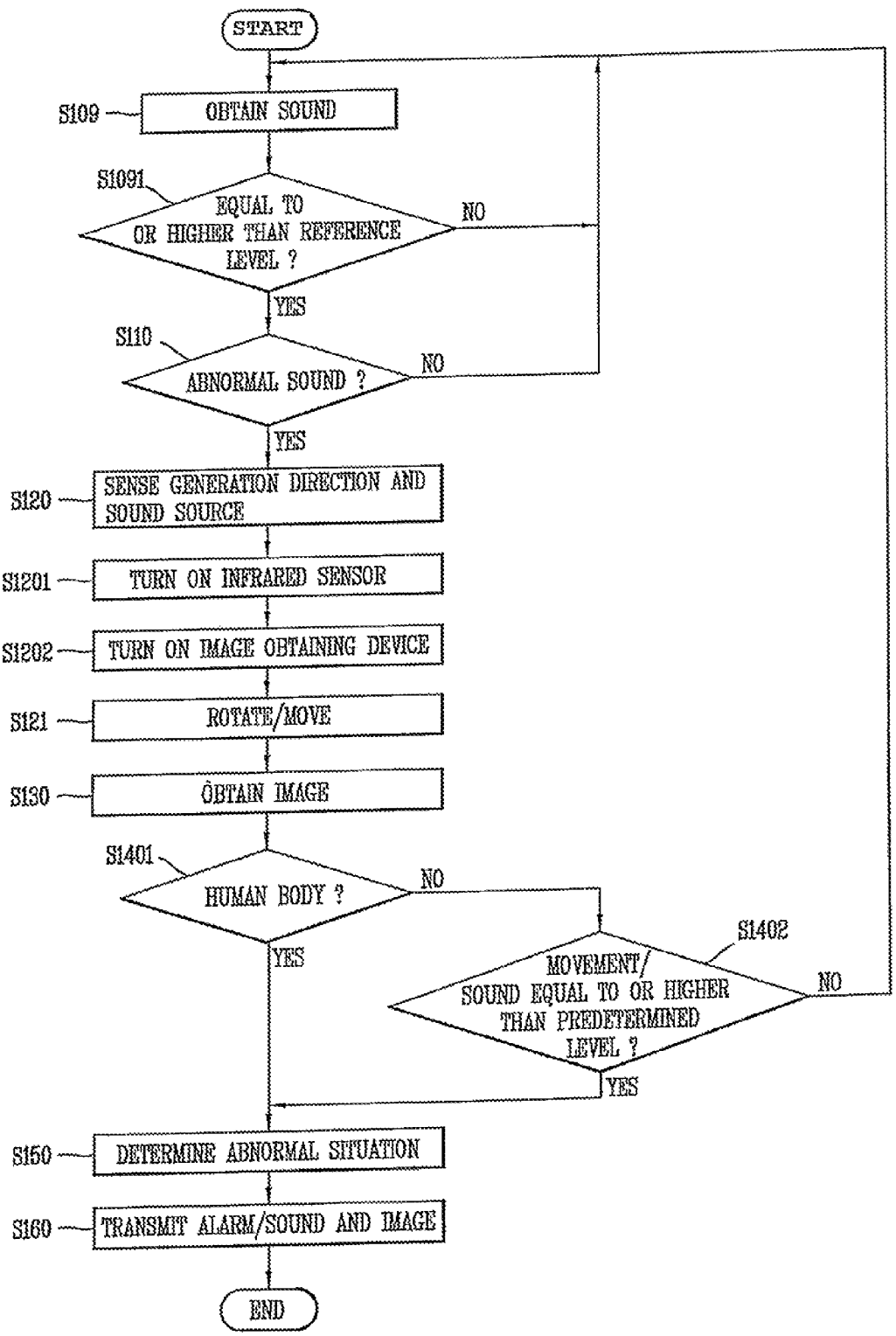
FIG. 7 is a flow chart of a method for controlling a robot cleaner according to an embodiment.

FIG. 7 is a flow chart of a method for controlling a robot cleaner according to an embodiment. As illustrated in FIG. 7, a method for controlling a robot cleaner according to this embodiment may include obtaining a sound through at least one sound obtaining device, in step S109; determining whether the sound is abnormal, in step S110; sensing a direction in which the abnormal sound is generated, in step S120, and obtaining an image in a direction in which the abnormal sound is generated, in step S130.

Hereinafter, each step will be described in detail with reference to FIGS. 1 through 6. Redundant descriptions of components the same as those of the previous embodiment will be omitted.

First, a controller, such as controller 110, may obtain an ambient sound of a robot cleaner, such as robot cleaner 100, through at least one sound obtaining device, such as sound obtaining device 130, in step S109. In this case, in determining whether a sound is abnormal, the controller may filter only sounds with sound pressure equal to or higher than a predetermined level, among sounds obtained through the at least one sound obtaining device, and determine whether the filtered sounds are abnormal. This is to exclude sound waves introduced from the outside of a cleaning area, thus preventing unnecessary power consumption of the robot cleaner.

The controller may determine whether sound pressure of the sound obtained through the at least one sound obtaining device has a level equal to or higher than a reference level, in step S1091, and when the sound pressure of the sound obtained through the at least one sound obtaining device has a level equal to or higher than the reference level, the controller may determine that the sound is abnormal, in step S110.

Thereafter, the controller may determine whether the sound obtained through the at least one sound obtaining device is abnormal, in step S110. Determining whether the obtained sound is abnormal may be performed through various known means or methods. In one embodiment, the controller may compare the obtained sound with sounds stored in a sound DB, such as sound DB 191, and when a sound identical or similar to the obtained sound exists in the sound DB, the controller may determine that the obtained sound is abnormal. In this case, the controller may calculate a similarity between the sound obtained through the at least one sound obtaining device and sound stored in the sound DB to determine whether the sounds are identical and/or determine a degree by which the sounds are similar.

When the controller determines that the sound obtained through the at least one sound obtaining device is abnormal, in step S110, the robot cleaner may determine that a current situation is abnormal, in step S150, and transmit an alarm signal to a remote terminal or a server through a communication device, such as communication device 180. As illustrated in FIG. 5, the robot cleaner may transmit an alarm signal to at least one terminal, such as terminal 200, for example, a computer, such as computer 200a, a smart TV, such as smart TV 200b, or a smartphone or mobile terminal, such as smartphone or mobile terminal 200c, for example, to alert a remote user to the abnormal situation. In this case, the robot cleaner may be directly connected to the terminal to transmit and receive data to and from the terminal, or may transmit and receive data to and from the terminal through at least one server (not shown) connected to a heterogeneous network. The controller may transmit the sound obtained through the at least one sound obtaining devices together with an alarm signal to the remote terminal or a server, for user notification, so that the user may determine whether the current abnormal situation an emergency.

After determining whether the sound obtained through the at least one sound obtaining devices is abnormal, in step S110, the controller may determine a direction in which the abnormal sound is generated and/or a sound source. The controller may recognize a direction in which a sound is generated outside using a plurality of sound obtaining devices, such as sound obtaining device 130a, 130b, 130c, disposed outside of the robot cleaner 100. In detail, the controller may determine any one sound obtaining device having a highest sound pressure, among the plurality of sound obtaining devices, and sense a direction in which an external sound is generated based on a position of the determined sound obtaining device. In order to accurately calculate a movement target point, the controller may recognize a sound source in which an abnormal sound is generated. The sound source may be recognized through various known means or methods. In one embodiment, the controller may recognize the sound source by estimating a distance to the sound source from which the abnormal sound has been generated, based on sound pressure of a sound wave obtained through the sound obtaining device. Alternatively, the controller may store at least one estimated sound generation point on a map corresponding to various sounds stored in the sound DB, and the controller may recognize an estimated sound generation point corresponding to a direction in which the abnormal sound is generated, sensed through the sound obtaining device, as a sound source.

After the controller senses a direction in which an abnormal sound is generated and/or a sound source, in step S120, the controller may rotate the robot cleaner in the corresponding direction or may rotate and/or move the robot cleaner toward the sound source using a drive, such as drive 160, in step S121.

The method for controlling a robot cleaner according to an embodiment may further include operating an infrared sensor, such as infrared sensor 150, in step S1202, and operating at least one image obtaining device, such as image obtaining device 140, in step S1202, between sensing a direction in which an abnormal sound is generated and/or a sound source, step S120, and obtaining an image, in step S130.

As described above, the controller may use the image obtaining device to obtain images. However, if power is continuously supplied to the image obtaining device through a power supply, such as power supply 120, a large amount of power may be consumed. Thus, in one embodiment, the robot cleaner may use the infrared sensor. When heat having a temperature equal to or higher than a predetermined temperature is sensed in the vicinity of the robot cleaner, power may be supplied to the at least one image obtaining device to operate the at least one image obtaining device, thus reducing power consumption.

The controller may control the infrared sensor to operate only when a sound obtained through the sound obtaining device is determined to be abnormal, whereby additional power consumption that may be caused by the infrared sensor may be prevented. Thereafter, the controller may obtain images in a direction in which an abnormal sound is generated through the at least one image obtaining device.

The controller may obtain images surrounding the robot cleaner through the at least one image obtaining device installed in a front portion or in an upper portion of the robot cleaner. The controller may obtain images in a direction in which an abnormal sound is generated or images of a sound source, or may obtain images while the robot cleaner is rotated or moved. In this case, the images obtained by the at least one image obtaining device may be any one of still images or video. In the case of a plurality of still images continuously obtained while the robot cleaner is being rotated, the controller may process the still images into a single panoramic image, whereby although the at least one image obtaining device includes a lens having a narrow angle of view, an image in a wider range without an omitted image may be obtained.

As described above, in a case in which the controller determines that the sound obtained through the at least one sound obtaining device is abnormal, the controller may transmit an alarm signal to a remote terminal or a server through the communication device. In this case, the controller may transmit the sound obtained through the at least one sound obtaining device and/or the images obtained through the at least one image obtaining device together, in step S160, so as to be provided to the user.

When the controller obtains images, the controller may process the images obtained through the at least one image obtaining device to determine whether a subject is present. In this case, in order to increase accuracy of determination of an abnormal situation, the method for controlling a robot cleaner according to an embodiment may further include sensing a human body image or an animal image, in step S1401.

The controller may sense a human body image and an animal image within images by processing still images or video through various algorithms. In a case in which the controller senses a human body image within images obtained through the at least one image obtaining device, the controller may determine that a current situation is abnormal, in step S150, and transmit the sound obtained through the at least one sound obtaining device and/or the images (including the human body image) obtained through the at least one image obtaining device to a remote terminal or a server through the communication device, in step S160. On the other hand, in the case of sensing an animal image, rather than a human body image, within images obtained through the at least one image obtaining device, when a movement change speed of the image regarding the sensed animal (subject) is equal to or greater than a predetermined speed or when a sound obtained with respect to the sensed animal (subject) is equal to or greater than a predetermined level, in step S1402, the controller may determine that a current situation is abnormal, step S150, and transmit the sound obtained through the at least one sound obtaining device and/or the images (including the human body image) obtained through the at least one image obtaining device to a remote terminal or a server through the communication device, in step S160.

Through these processes, accuracy of determining by the robot cleaner as to whether a current situation is abnormal may be increased, and by providing the abnormal sound and/or images to the remote terminal, the user may determine whether the abnormal situation is an emergency.

A robot cleaner according to another embodiment may recognize a position of a contamination material using a sound and/or an image obtained through the sound obtaining device 130 and/or the image obtaining device 140, and automatically clean the contamination material.

Thus, the robot cleaner may quickly remove the contamination material and since the robot cleaner does not need to perform cleaning on the entirety of a house, and thus, power consumption of the robot cleaner may be reduced.

Figure 8:
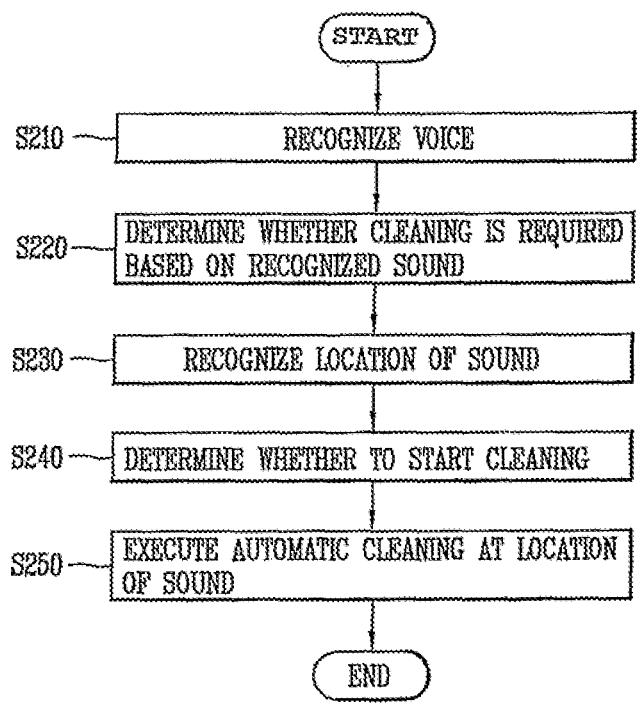
FIG. 8 is a flow chart of a method for oiling a robot cleaner according to another embodiment.

FIG. 8 is a flow chart illustrating a method of operating a robot cleaner according to another embodiment.

First, the robot cleaner 100 detects a sound in step S210.

When the robot cleaner 110 is in a standby mode, a running mode, or a cleaning mode, the sound obtaining device 130 may be in an activated state. When a certain sound is generated from somewhere in a house, the sound obtaining device 130 receives the sound. The sound obtaining device 130 delivers the received sound to the controller 110.

The controller 110 analyzes the received sound using an algorithm, for example, to recognize it. In a case in which a sound in a certain pattern is stored in the sound DB 191 in advance, the controller 110 may compare the received sound with the stored sound in a certain pattern to determine a type of the sound.

Alternatively, the controller 110 may be connected to an external server (not shown) using the communication device 180, transmit the received sound to the external server 300, and receive analysis information from the external server (not shown).

Thereafter, the robot cleaner 100 determines whether cleaning is required based on the recognized sound, in step S220.

The controller 110 may immediately determine whether to perform automatic cleaning based on the recognized sound.

For example, when the recognized sound is a sound of footsteps or a sound output from an electronic device such as a TV or a phone, for example, the controller may determine that automatic cleaning is not required.

Namely, when the recognized sound is a sound generated in daily life stored in the sound DB 191 or when it is within a predetermined difference from a sound generated in daily life, the controller 110 may determine that automatic cleaning may not be required. Namely, the controller may provide control such that cleaning is not automatically performed.

In another example, in a case in which a recognized sound is a sound caused due to rotation of a motor according to an operation of a hair dryer, the controller 110 may determine that automatic cleaning is not required. In another example, in a case in which children spill over cracker or cookie, for example, on the floor, the controller 110 may determine that automatic cleaning is required based on the sound.

Meanwhile, the controller 110 may control the robot cleaner to perform automatic cleaning in further consideration of the most recent cleaning time or a coming pre-set reserved cleaning time, in addition to generation of a sound.

Namely, in case of performing automatic cleaning due to a generation of a sound, the controller 110 may compare a point in time at which the sound is generated with the most recent cleaning time or a coming pre-set reserved cleaning time to finally determine whether to perform automatic cleaning.

For example, in a case in which a sound caused due to rotation of a motor is received from a hair dryer after cleaning was performed according to execution of a cleaning mode five minutes ago, the controller 110 may not perform cleaning immediately but provide control to perform automatic cleaning after the lapse of a predetermined time.

In another example, in a state in which cleaning mode is scheduled to be executed in three minutes based on reservation, when a sound caused due to rotation of a motor is received from a hair dryer, the controller 110 may provide control to perform automatic cleaning at the reserved time after three minutes, rather than performing cleaning immediately.

Next, the robot cleaner 100 recognizes a location of a sound, in step S230.

In a case in which the controller 110 determines that performing automatic cleaning is required based on the recognized sound, the controller 110 may recognize the location of the sound and make preparation for execution of automatic cleaning.

To this end, while the sound is being generated, the controller 110 may control the drive 160 of the robot cleaner 100 to move the robot cleaner 100.

In detail, while the robot cleaner is moving or rotating in four directions, for example, in the rightward, leftward, upward, and downward directions, the controller 110 may recognize a location of a sound based on a difference in strength of the recognized sound, a difference in phase of the recognized sound, for example, similar to the Doppler effect.

Also, the controller 110 may recognize a location of a sound, while traveling in a house.

Thereafter, the robot cleaner 100 determines whether to perform cleaning, in step S240.

After recognizing a sound for determining to perform automatic cleaning, the controller 110 may determine a point in time at which automatic cleaning is to start.

For example, in a case in which a sound caused due to rotation of a motor according to operation of a hair dryer is continuously received, even though the controller 110 already recognizes a location of the sound, the controller 110 may not actually enter the automatic cleaning mode until when the sound is stopped, and when the sound is stopped, the controller 110 may provide control to start cleaning. Alternatively, the controller may provide control to start cleaning about one minute after the sound is stopped.

Thus, since an automatic cleaning start point is determined accurately, performing automatic cleaning at a point in time at which cleaning is not substantially required may be prevented.

Next, the robot cleaner 100 executes automatic cleaning at the location of the sound, in step S250.

The controller 110 controls the drive 160 to move to the location of the already recognized sound and controls a cleaning unit (not shown) to perform automatic cleaning in the vicinity of the location of the corresponding sound.

In this manner, since cleaning is automatically performed at the location of the sound after the sound is recognized, a contamination material can be quickly removed. Also, since there is no need to unnecessarily clean the entirety of the interior of the house, unnecessary power consumption of the robot cleaner 100 may be reduced.

Figure 9A:
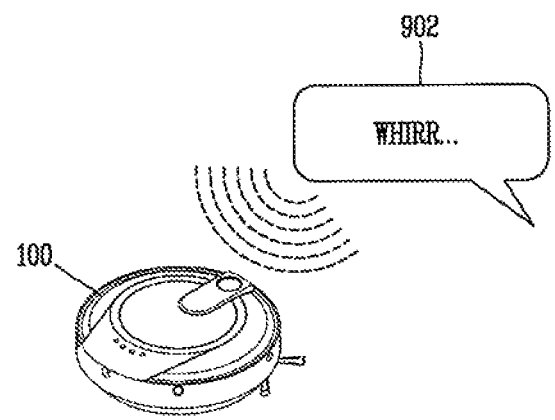
FIGS. 9A through 11B are views illustrating the control method of FIG. 8.
Figure 9C:
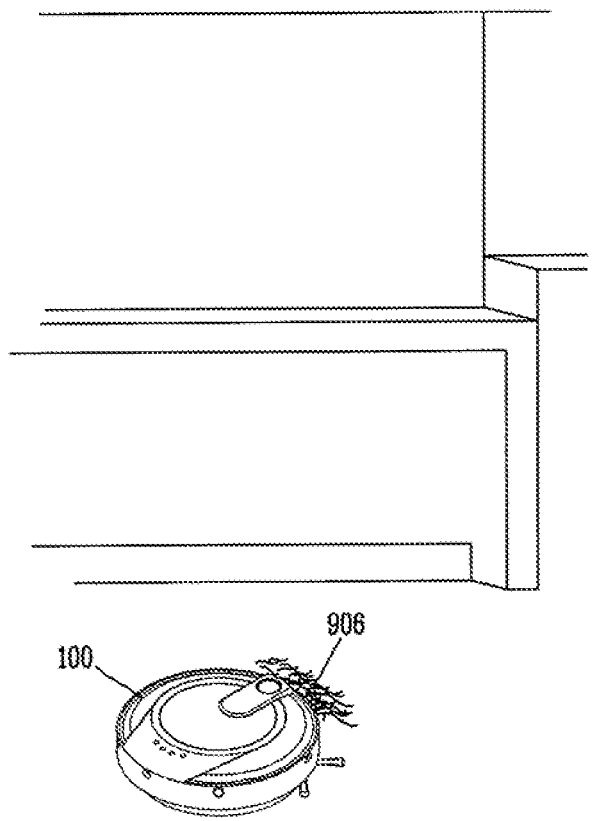

FIGS. 9A and 9B are views illustrating an operation method of FIG. 8.

FIG. 9A illustrates a situation in which the robot cleaner 100 receives a certain sound 902. In this case, the sound obtaining device 130 of the robot cleaner 100 receives the sound 902 and converts the received sound 902 into an electrical signal. The controller 110 receives the converted electrical signal.

Based on the received electrical signal, the controller 110 identifies whether the input signal is a sound generated in daily life or a sound requiring cleaning. The controller 110 may identify the sound by itself or may receive corresponding information from an external server (not shown) or the mobile terminal 200.

FIG. 9B illustrates a situation in which the robot cleaner 100 moves to the vicinity of a generated sound, by the drive 160.

Based on recognition of a sound 903, the controller 110 recognizes a location of the sound and controls the robot cleaner 100 to move to the location where the corresponding sound is generated.

In the drawing, it is illustrated that the corresponding sound 903 is generated as a user 901 uses a hair dryer. When the user uses the hair dryer, hair 906 may fall around the user 901. Thus, in one embodiment, when a particular sound is generated, cleaning is controlled to be automatically performed using the robot cleaner 100.

FIG. 9G illustrates execution of automatic cleaning at a location of a corresponding sound When the user 901 stops using the hair dryer, namely, when the corresponding sound 903 is not generated any longer, the controller 110 of the robot cleaner 100 may provide control to perform an automatic cleaning mode.

The cleaning unit (not shown) of the robot cleaner 100 may operate a motor, for example, to execute automatic cleaning to suck in the hair 906. Thus, automatic cleaning may be simply and promptly performed at a location of a particular sound.

Figure 9D:
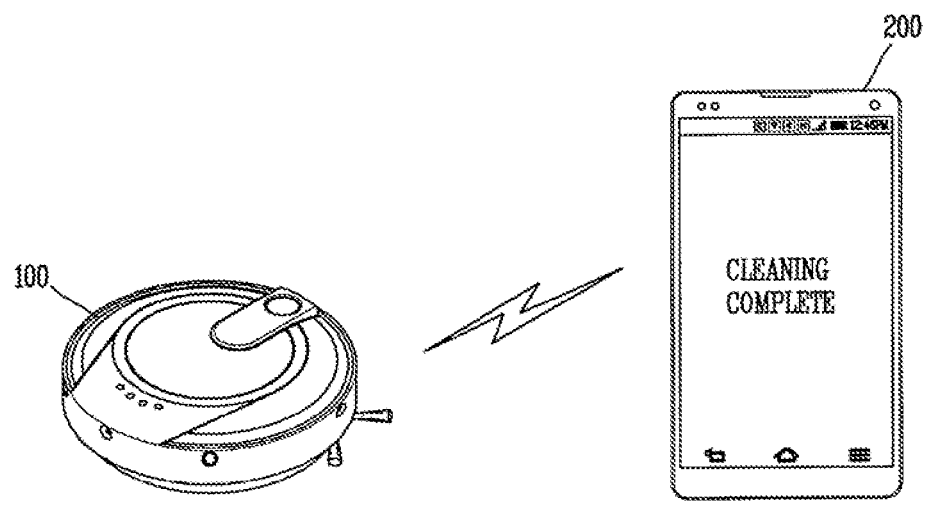

FIG. 9D illustrates a case in which the robot cleaner 100 transmits an automatic cleaning completion message to the mobile terminal 200 of the user according to completion of automatic cleaning. Accordingly, the user may recognize that automatic cleaning has been completed, through the mobile terminal 200.

Meanwhile, a sound for executing the automatic cleaning mode may include various sounds other than the sound 903 of the hair dryer as described above with reference to FIGS. 9A through 9D. For example, the automatic cleaning mode may be executed based on a user's voice.

Meanwhile, FIGS. 9A through 9D shows the cases in which a contamination material is detected by recognizing a sound, but a contamination material may be recognized through an obtained image.

Namely, image data captured through the camera 230 may be compared with previously stored image data, and when a difference between the captured image data and the previously stored image data is equal to or more than a predetermined value, the controller 110 may recognize that a contamination material is present. The controller 110 may provide control to perform automatic cleaning mode.

Figure 10A:
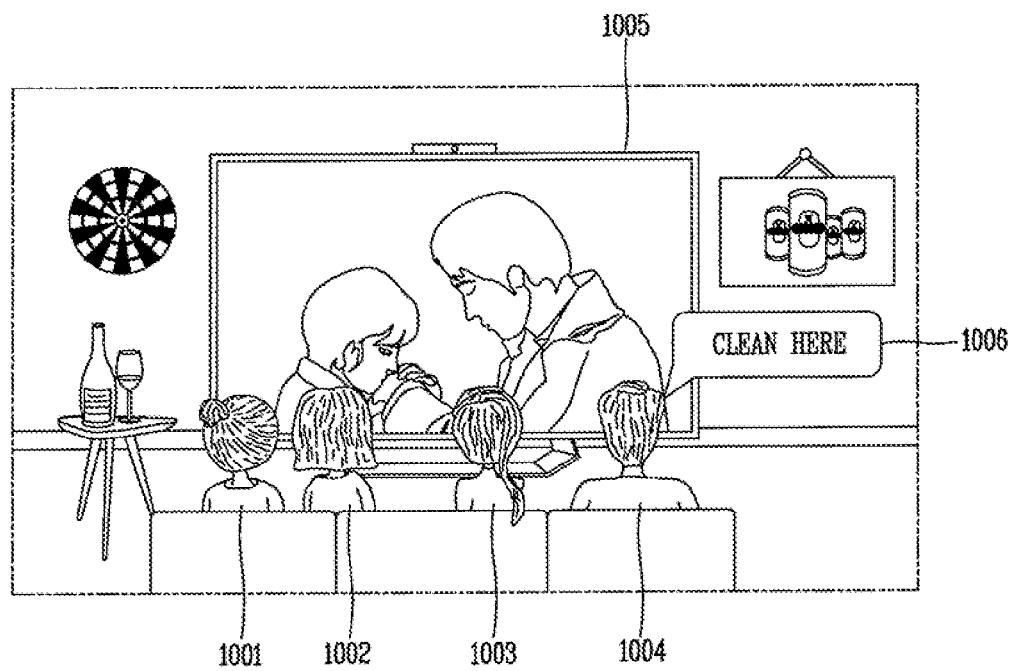

FIG. 10A illustrates a case in which, while users 1001, 1002, 1003, and 1004 are viewing a TV 1005, a cleaning start voice 1006 is generated by any one user 1004.

Figure 10B:
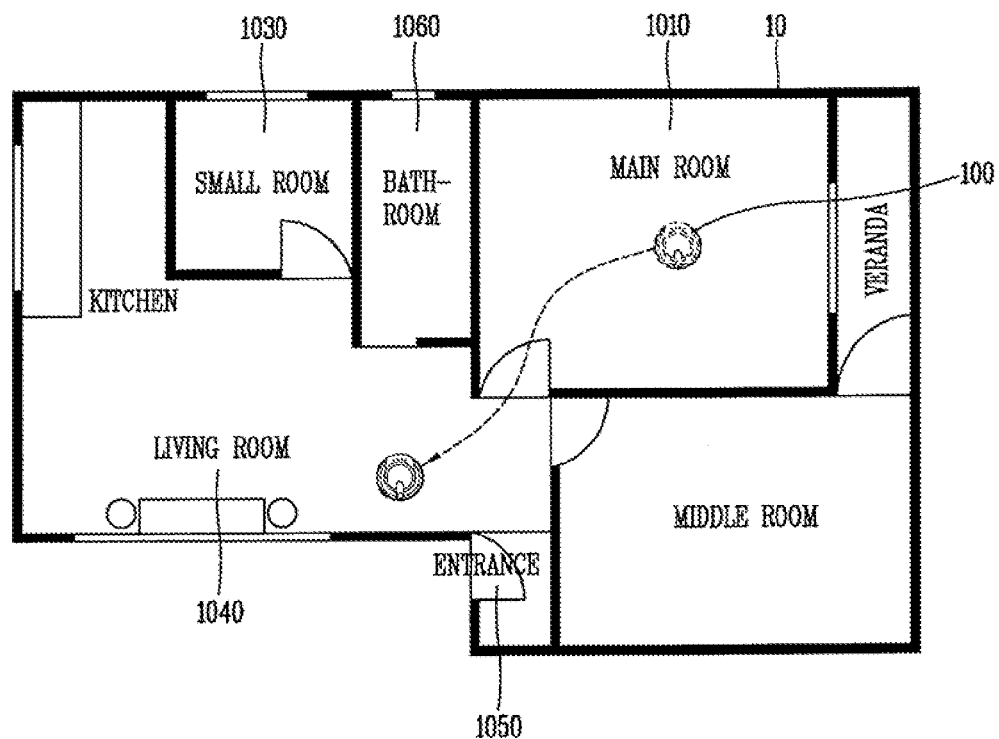

FIG. 10B illustrates a case in which the robot cleaner 100 located in a main room 1010 moves to a living room 1040 in the housing 10.

The sound obtaining device 130 of the robot cleaner 100 may receive an audio signal from a TV 1005 and a voice 1006 from the user 1004.

The controller 110 may distinguish the audio signal from the TV 1005 and the voice 1006 from the user 1004 and recognize the voice 1006 from the user 1004.

When the voice is "Clean here", the controller 110 of the robot cleaner 100 may determine that the living room where the users are present needs to be cleaned.

Figure 10C:
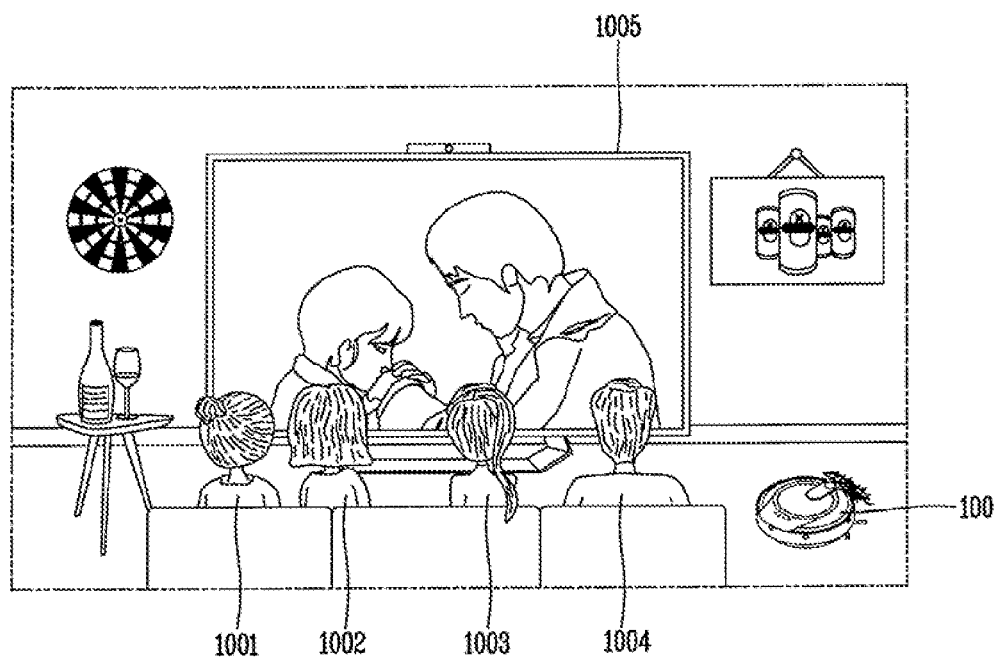

FIG. 10C illustrates that the robot cleaner 100 performs automatic cleaning based on the voice 1006. Accordingly, cleaning may be performed simply based on the user's voice 1006.

FIGS. 10A through 10C illustrate the cases that the location where the user's voice is generated and the location of the robot cleaner 100 are different.

Figure 11A:
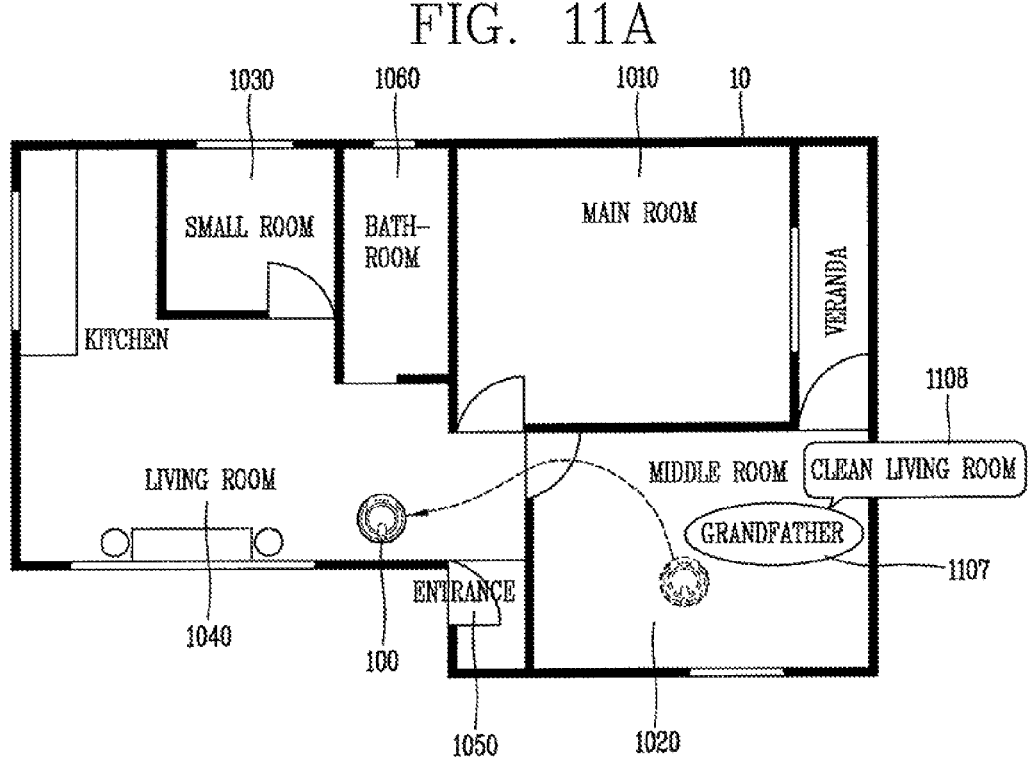

Meanwhile, FIG. 11A illustrates a case in which a voice 1100 is generated by a grandfather present in a middle room 1020. In particular, in the drawing, a case in which a voice 1108 "Clean living room" is generated is illustrated.

The DB 190 of the robot cleaner 100 may have a map of the interior of the house 10. Thus, in the case in which the voice 1008 "Clean living room" is generated, the controller 110 may determine a movement path and direction and control the drive 160 to move the robot cleaner 100 toward the living room 1040.

Figure 11B:
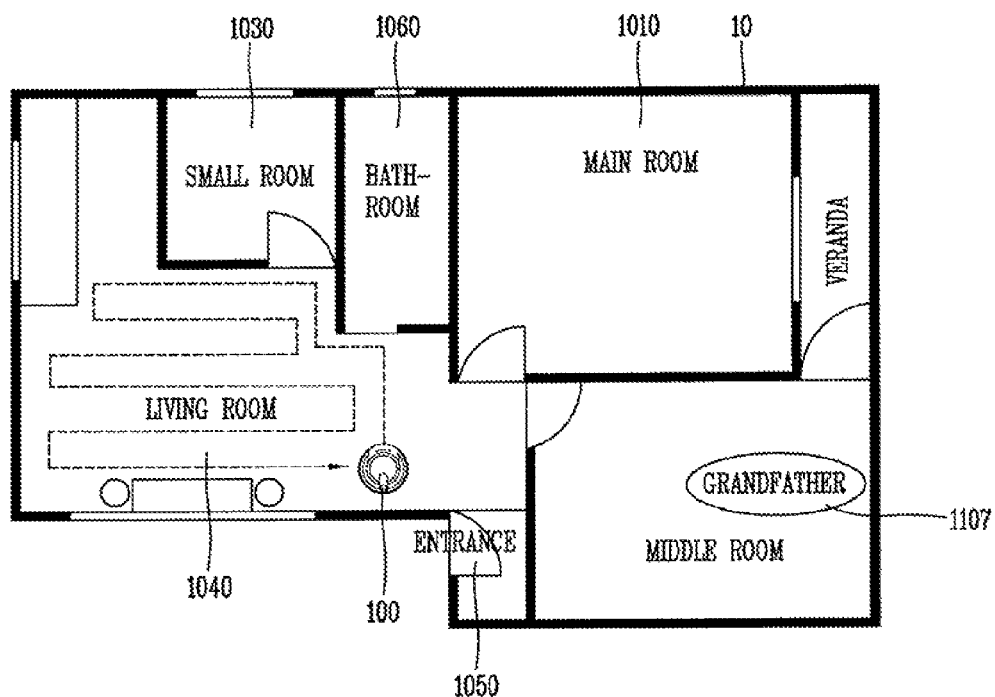

FIG. 11B illustrates a case in which the robot cleaner 100 which has moved to the living room 1040 performs a cleaning mode. In particular, FIG. 11B illustrates a case in which the robot cleaner 100 performs the cleaning mode, while moving along a particular movement pattern. Here, the movement pattern may be varied by a user setting. Alternatively, a movement pattern may be varied according to a most recent cleaning execution point (or according to a point in time at which cleaning has been performed most recently).

For example, in a case in which the most recent cleaning execution point with respect to the living room 1040 is two days ago, the robot cleaner 100 may perform cleaning, while moving with a fine (more dense) movement pattern. Meanwhile, when the most recent cleaning execution point is an hour ago, the robot cleaner 100 may perform cleaning, while moving with a less dense movement pattern.

Figure 12:
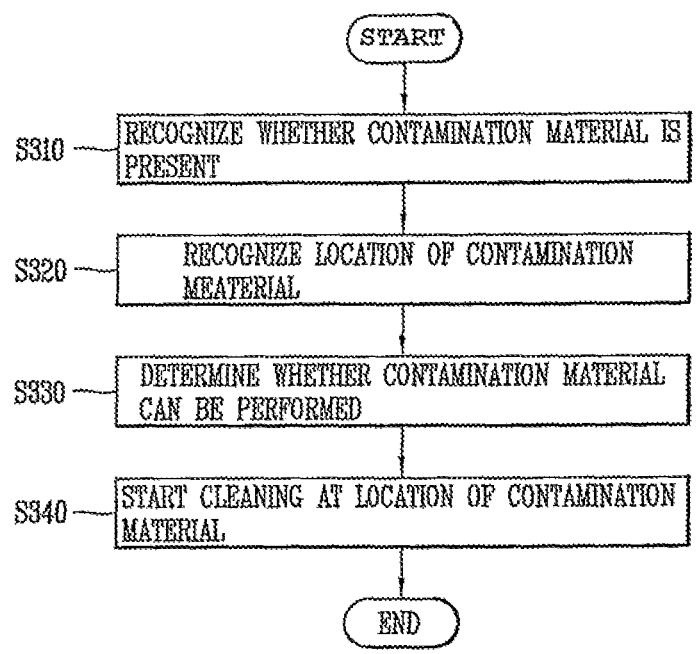
FIG. 12 is a flow chart of a method for controlling a robot cleaner according to another embodiment.

FIG. 12 is a flow chart of a method for operating a robot cleaner according to another embodiment.

First, a robot cleaner, such as the robot cleaner 100, recognizes whether a contamination material is present, in step S310.

When the robot cleaner is in a standby mode, a travel mode, or cleaning mode, either the sound obtaining device 130 or the image obtaining device 140 may be in an activated state. When a certain sound is generated from somewhere in the housing, the sound obtaining device 130 may receive the sound and the image obtaining device 140 may capture an image of the interior of the house.

In particular, in a state in which the robot cleaner 100 is moving in the travel mode or the cleaning mode, the audio obtaining device 130 or the image obtaining device 140 may receive a sound an capture an image, respectively.

The audio obtaining device 130 or the image obtaining device 140 delivers the received sound or the captured image to the controller 110.

The controller 110 may recognize the received sound using an algorithm, or the like, may be connected to an external server (not shown) using the communication device 180, may transmit the received sound to the external server, and subsequently receive analysis information from the server.

Based on the captured image, the controller 110 may discriminate whether the contamination material is present on the floor within the house. For example, the controller 110 may compare the captured image with an image of cleaning-completed interior of the house stored in the image DB 192, and may recognize whether a contamination material exists based on the difference. Alternatively, the controller 110 may transmit the captured image to the external server (not shown) and receive information regarding whether a contamination material exists from the external server.

For example, in a case in which a recognized sound is a sound of a footprint, or a sound output from an electronic device such as a TV, a phone, or the like, the controller 110 may determine that a contamination material is not present.

In another example, in a case in which a recognized sound is a sound caused due to rotation of a motor according to an operation of a hair dryer, the controller 110 may determine that a contamination material is present. Also, in another example, in a case in which children spill over cracker or cookie, for example, on the floor, the controller 110 may determine that automatic cleaning is required based on the sound.

In another example, when a foreign object such as cracker, for example, is on the floor within the captured image, the controller 110 may determine that a contamination material is present.

The robot cleaner 100 recognizes a location of the contamination material, in step S320.

Based on the recognized sound or captured image, the controller 110 may recognize whether a contamination material is present or a location of the contamination material.

To this end, the controller 110 may control the drive 160 of the robot cleaner 100 to move the robot cleaner 100. While the robot cleaner 100 is moving, the controller 110 may recognize the location of the contamination material.

Meanwhile, step S320 may be performed together with step S310. Namely, the controller 110 may recognize whether a contamination material is present and recognize a location of the contamination together.

Next, the robot cleaner 100 determines whether the contamination material can be cleaned, in step S330.

After a location of the contamination material is recognized, the controller 110 may determine whether the contamination material can be cleaned.

For example, in a case in which a sound caused due to rotation of a motor according to an operation of a hair dryer is continuously received, although the controller 110 already recognizes a location of the contamination material, the controller 110 may not actually enter the automatic cleaning mode until when the sound is stopped, and when the sound is stopped, the controller 110 may provide control to start cleaning. Alternatively, the controller may provide control to start cleaning about one minute after the sound is stopped.

Accordingly, since an automatic cleaning start point is determined accurately, performing automatic cleaning at a point in time at which cleaning is not substantially required may be prevented.

Meanwhile, after a location of the contamination material is recognized, the controller 110 may determine whether there is an obstacle around the contamination material, and whether automatic cleaning may be performed with an obstacle present around.

For example, in a case in which there is a to on the floor of the living room, when books, for example, are placed nearby, the controller 110 may determine whether the robot cleaner may move to the vicinity of the waste.

When the robot cleaner is not possible to move, the controller 110 may transmit a message indicating that it is impossible to automatically clean the contamination material to the mobile terminal 200 of the user through the communication device 180.

In another example, when a waste is present in the children's room but the size of the waste is big, the controller 110 may recognize the waste as a contamination material but determine that it is impossible to clean the contamination material.

Thereafter, the robot cleaner 100 starts cleaning at the location of the contamination material, in step S340.

The controller 110 controls the drive 160 at a point in time at which the contamination material can be cleaned, to move the robot cleaner 100 to the already recognized location of the contamination material, and controls the cleaning unit (not shown) in the vicinity of the location of the corresponding contamination material to perform automatic cleaning.

In this manner, since automatic cleaning is immediately executed at the location of the contamination material after the contamination material is recognized, the contamination material can be promptly removed. Also, since there is no need to clean the entirety of the housing unnecessarily, unnecessary power consumption of the robot cleaner 200 can be reduced.

Meanwhile, detection of a location of a contamination material based on a sound, for example, has been described above with reference to FIGS. 9A through 11B, so a description thereof will be omitted here. Hereinafter, recognizing a contamination material based on an image captured by the image obtaining device 140 and cleaning is performed automatically will be described.

FIGS. 13A through 13F are views illustrating an operation method of FIG. 12.

Figure 13A:
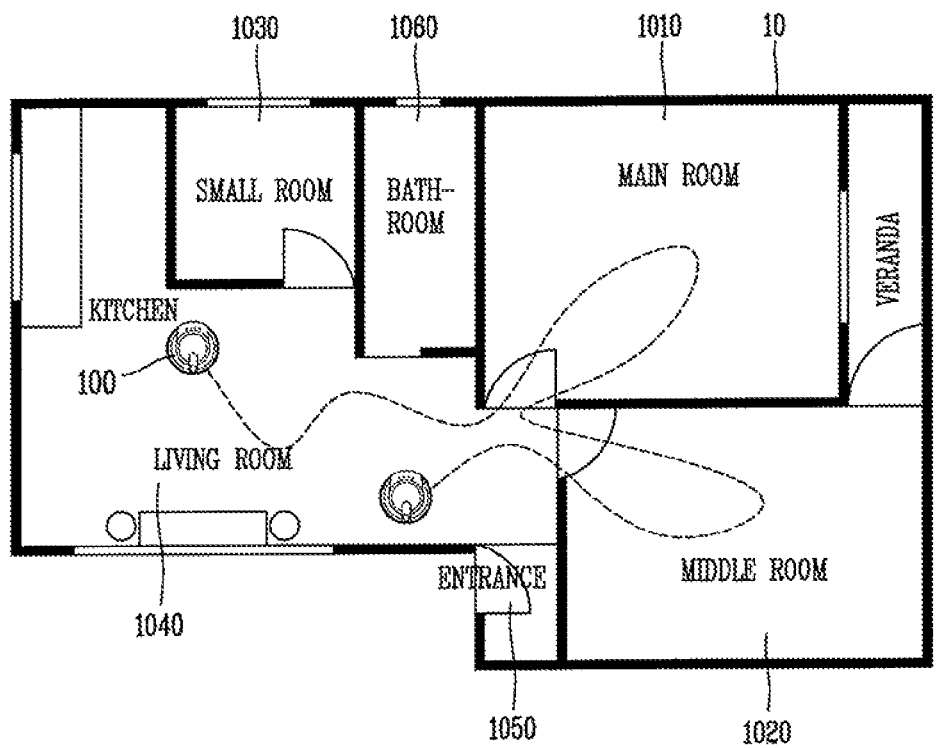
FIGS. 13A through 13F are views illustrating the control method of FIG. 12.

FIG. 13A illustrates a case in which the robot cleaner 200 travels here and there in the house 10. When the robot cleaner 200 travels, the image obtaining device 140 may be activated to capture an image.

The controller 110 may compare a captured image with an image previously stored in the image DB 192 and determine whether a contamination material is present based on a difference between the captured image and the stored image.

Figure 13B:
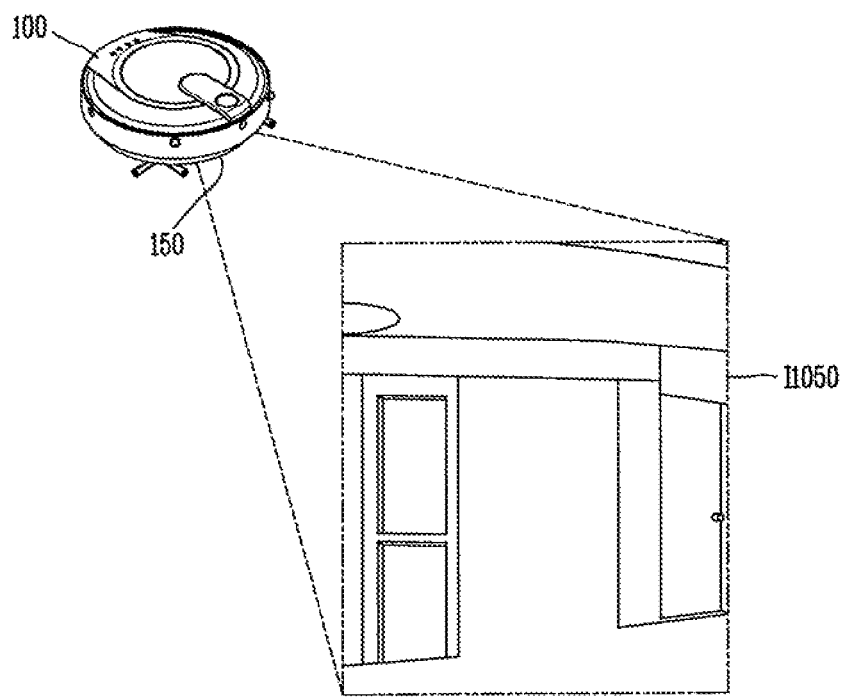
Figure 13C:
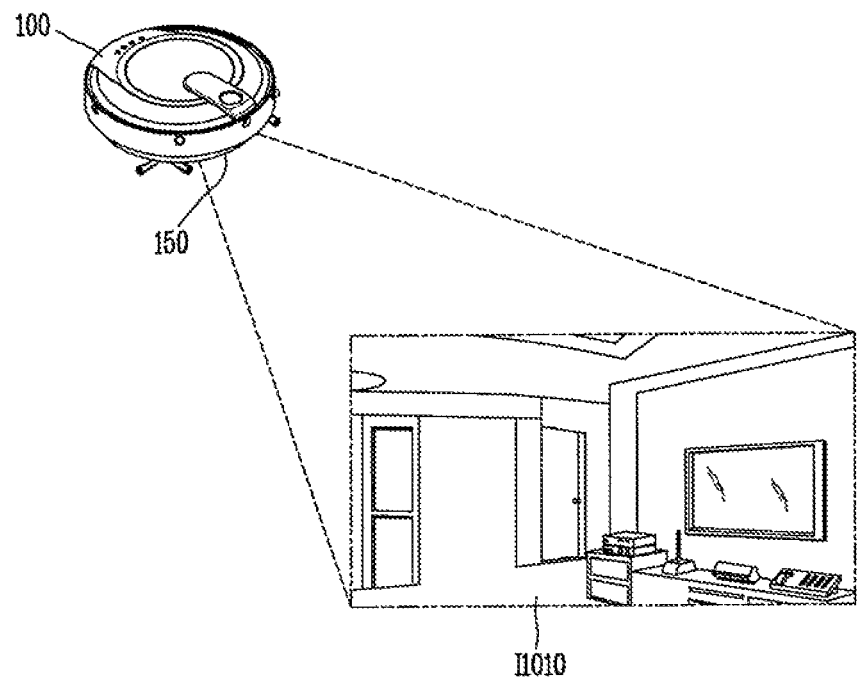
Figure 13D:
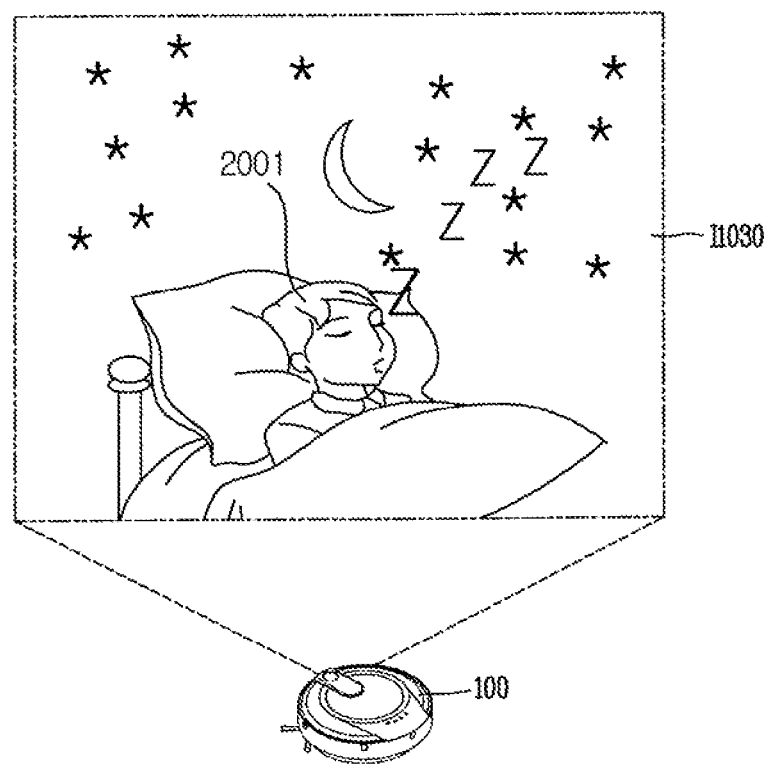
Figure 13E:
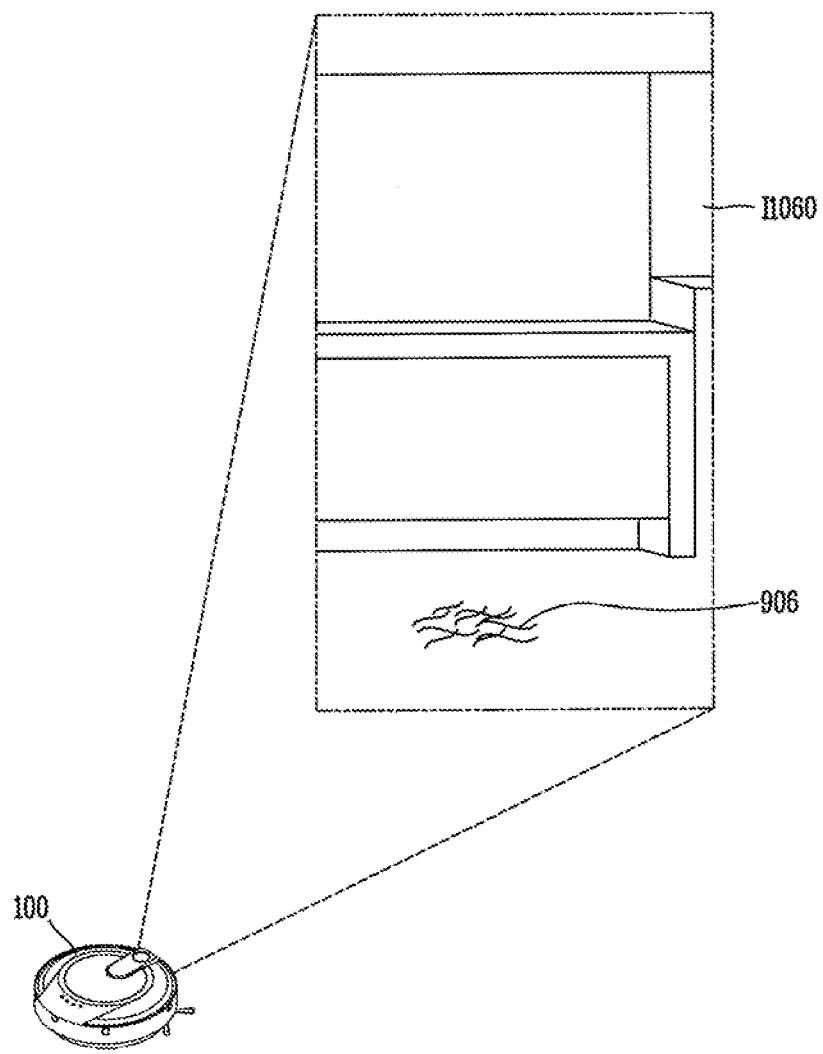

FIG. 13B illustrates a captured image of the entrance I1050, FIG. 13C illustrates a captured image of a living room I1010, FIG. 13D illustrates a captured image of a small room I1030 including the user 1301, and FIG. 13E illustrates a captured image I1060 in front of a bathroom.

The captured images of FIGS. 13B to 13D do not include any foreign object on the floor, and thus, the controller 110 may determine that there is no contamination material.

Meanwhile, the captured image of FIG. 13E includes hair 906 on the floor, and thus, the controller 110 may determine that there is a contamination material, and provide control to perform automatic cleaning mode.

Figure 13F:
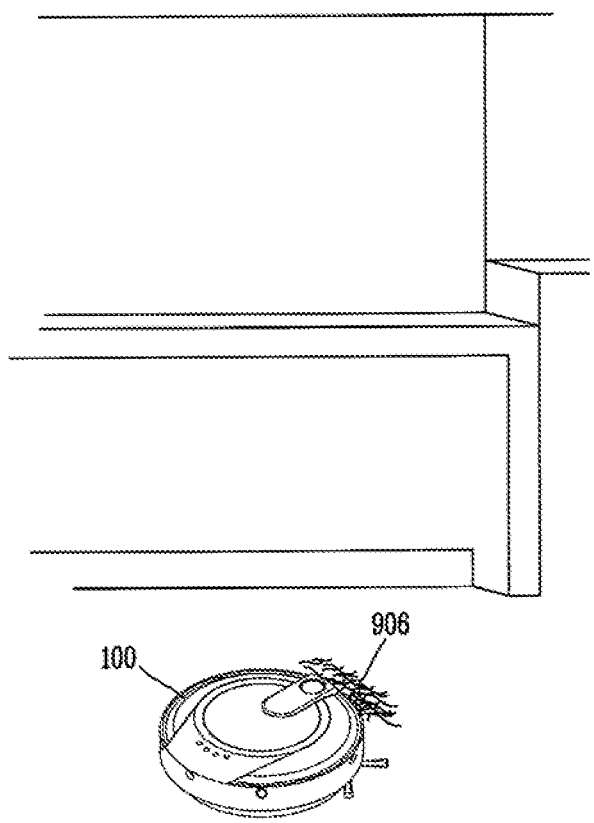

Namely, as illustrated in FIG. 13F, the contamination material 906 may be sucked in through the cleaning unit (not shown). Accordingly, automatic cleaning may be simply performed.

Meanwhile, as illustrated in FIG. 13D, although the captured image I1030 of the small room including the user 1301 includes a foreign object on the floor, if the user is asleep, automatic cleaning may be controlled not to be performed. Thereafter, when the user 1301 is awake, automatic cleaning may be executed.

The method for controlling a robot cleaner according to an embodiment may be implemented in the form of a program command that may be performed through various computer components and recorded in a computer-readable recording medium. The computer-readable recording medium may include a program command, a data file, and a data structure, for example, alone or in a combination thereof. A program command recorded in the medium may be particularly designed or configured, or may be known to be used by a computer software person in the art. Examples of the computer-readable recording medium include a hardware device particularly configured to store and perform a program command, such as a magnetic medium, such as a hard disk, a floppy disk, or a magnetic tape, an optical medium, such as a CD-ROM or a DVD, a magneto-optical medium, such as a floptical disk, and a ROM, a RAM, or a flash memory, for example. Examples of program commands include high level language codes that may be executed by a computer using an interpreter, for example, as well as mechanical language codes created by a compiler. The hardware device may be configured to operate by one or more software modules to perform processing according to embodiments, and vice versa.

Embodiments disclosed herein provide a robot cleaner including a monitoring function capable of minimizing power consumption and/or increasing communication efficiency, and a method for controlling a robot cleaner.

Embodiments disclosed herein provide a robot cleaner that may include at least one sound obtaining device; at least one image obtaining device; and a controller configured to determine whether a sound obtained through each sound obtaining unit is abnormal, sense a direction in which an abnormal sound is generated, and obtain images of the direction in which the abnormal sound is generated. The controller may rotate the robot cleaner in a direction in which the abnormal sound is generated through the drive to obtain images. The controller may recognize a sound source of the abnormal sound.

The robot cleaner may further include a drive or device configured to control rotation or movement of the robot cleaner. The controller may rotate or move the robot cleaner in a direction of the sound source through the drive to obtain images. The controller may process a plurality of images continuously obtained by the image obtaining unit while the robot cleaner is being rotated by the drive, to a single panoramic image.

The robot cleaner may include three sound obtaining units, and any one of the sound obtaining units may be at an angle of about 120 degrees with respect to an adjacent sound obtaining unit based on a center of the robot cleaner.

The robot cleaner may further include a sound database (DB) configured to store various daily life including non-abnormal sounds and abnormal sounds. The controller may calculate a similarity between the sound obtained by the sound obtaining units and sounds stored in the sound DB to determine whether the obtained sound is abnormal. The controller may filter out only sounds having sound pressure equal to or higher than a predetermined level, among the sounds stored in the sound DB, and determine whether the filtered sounds are abnormal.

The robot cleaner may further include an infrared sensor, and when a heat having a temperature equal to or higher than a predetermined temperature is sensed by the infrared sensor, the controller may operate the image obtaining unit to obtain images. When the sound obtained through the sound obtaining unit is determined as being abnormal, the infrared sensor may be operated.

The controller may process the images obtained through the image obtaining unit to sense a human body image. When a human body image is sensed, the controller may determine that a current situation is abnormal.

The controller may process the image obtained through the image obtaining unit to sense an animal image. When a movement change speed of the sensed subject image is equal to or greater than a predetermined speed or when sound pressure of the sound obtained with respect to the subject is equal to or higher than a predetermined level, the controller may determine that a current situation is abnormal.

The robot cleaner may further include: a communication device configured to transmit an alarm signal to a remote terminal or a server, when the controller determines that a current situation is abnormal. When the controller determines that a current situation is abnormal, the communication device may transmit the images obtained through the image obtaining unit or the sound obtained by the sound obtaining units to a remote terminal or a server.

Embodiments disclosed herein further provide a robot cleaner that may include: at least one sound obtaining device configured to obtain a sound; a controller configured to detect a location of a sound obtained through the at least one sound obtaining unit; a drive configured to control rotation or movement of the robot cleaner; and a cleaning unit configured to suck in foreign objects to perform cleaning, wherein the controller controls the drive to be moved to a source of the sound and controls the cleaning unit to perform cleaning at the location of the sound source.

The robot cleaner may further include: a sound database (DB) configured to store various daily life sounds, wherein when the sound obtained by the at least one sound obtaining device is different from the daily life sounds stored in the sound DB by within a predetermined range, the controller may provide control not to perform automatic cleaning.

When the sound obtained by the at least one sound obtaining device is a sound caused due to rotation of a motor according to an operation of a hair drier, the controller may provide control to perform automatic cleaning.

In case of performing automatic cleaning based on a generated sound, the controller may compare a time at which the sound is generated with the most recent cleaning time or with a coming pre-set reserved cleaning time to finally determine whether to perform automatic cleaning.

The robot cleaner may further include at least one image obtaining device, and the controller may compare image data captured by the image obtaining device with previously stored image data, and when a difference between the captured image data and the previously stored image data is more than a predetermined value, the controller may determine that a contamination material is present, and provide control to perform automatic cleaning.

Embodiments disclosed herein further provide a method for controlling a robot cleaner that may include determining whether a sound obtained through at least one sound obtaining device is abnormal; sensing a direction in which the abnormal sound is generated; and obtaining images in the direction in which the abnormal sound is generated through at least one image obtaining device. The method may further include recognizing a sound source of the abnormal sound.

The method may further include operating the image obtaining unit when a heat having a temperature equal to or higher than a predetermined temperature is sensed through an infrared sensor, after the sensing of the direction in which the abnormal sound is generated. The method may further include when the current situation is determined to be abnormal, transmitting an alarm signal to a remote terminal or a server.

Embodiments disclosed herein further provide a method for controlling a robot cleaner that may include recognizing a sound; detecting a location of the sound; and moving to the recognized location of the sound to perform cleaning at the location of the sound.

In the performing of cleaning, when the recognized sound is a sound caused due to rotation of a motor according to an operation of a hair drier, cleaning may be controlled to be performed automatically.

In the performing of cleaning, when the recognized sound is different from daily life sounds stored in a sound DB by within a predetermined range, the controller cleaning not be performed automatically.

In the performing of cleaning, whether to perform automatic cleaning may be determined by comparing a current time with the most recent cleaning time or with a coming pre-set reserved cleaning time.

The method may further include: determining whether a contamination material exists based on a captured image, wherein, in the performing of cleaning, captured image data may be compared with previously stored image data, and when a difference between the captured image data and the previously stored image data is more than a predetermined value, it may be determined that a contamination material is present, and automatic cleaning may be controlled to be performed.

Also, an embodiment provides a computer-readable recording medium recording a computer program for executing the method for controlling the robot leaner.

In the case of the robot cleaner and method for controlling the same according to embodiments, the robot cleaner may automatically recognize a surrounding situation, and when necessary, the robot cleaner may rotate and/or move in a corresponding direction and/or position to obtain images and/or transmit the obtained images to a remote terminal, thereby minimizing power consumption of the robot cleaner with limited power. Also, by reducing an amount of data transmitted to a remote terminal, communication may be effectively performed.

Also, as the robot cleaner may recognize a sound source, the robot cleaner may immediately move to a spot or a point where an abnormal sound has been generated within a short time. Also, accuracy may be increased when the robot cleaner determines whether a current situation is abnormal, and as an abnormal sound and/or corresponding images may be provided to a remote terminal, a user may determine whether the abnormal situation is an emergency.

Also, the robot cleaner may recognize a sound, detect a location of the sound, and execute automatic cleaning at the recognized location of the sound. Thus, the robot cleaner may recognize a contamination material and perform automatic cleaning.

Also, the robot cleaner may quickly remove a contamination material, and since a user does not need to perform cleaning on the entirety of an interior of a house, power consumption of the robot cleaner may be reduced.

Also, the robot cleaner may recognize a location of a contamination material through a microphone or a camera, for example, and start cleaning at the location of the contamination material. Thus, the location of the contamination material may be immediately recognized and cleaning may be performed.

Meanwhile, when execution of automatic cleaning is completed, a complete message may be transmitted to a mobile terminal, and thus, the user may recognize the completion of the automatic execution of cleaning.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As features may be embodied in several forms without departing from characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot cleaner, comprising:
   at least one sound obtaining device;
   at least one image obtaining device;
   a sound database (DB) configured to store various daily life sound; and
   a controller configured to determine whether a sound obtained through the at least one sound obtaining device is abnormal, sense a direction in which an abnormal sound is generated, and obtain images in the direction in which the abnormal sound is generated through the at least one image obtaining device, wherein the controller calculates a similarity between the sound obtained by the at least one sound obtaining device and sounds stored in the sound DB to determine whether the obtained sound is abnormal.

2. The robot cleaner of claim 1, further comprising:
   a drive configured to rotate or more the robot cleaner, wherein the controller controls the drive to rotate move the robot cleaner in the direction in which the abnormal sound is generated to obtain images related to the direction.

3. The robot cleaner of claim 1, further comprising:
   a drive configured to rotate or move the robot cleaner, wherein the controller detects a sound source of the abnormal sound and controls the drive to rotate or move the robot cleaner in a direction toward the sound source of the abnormal sound to obtain images related to the sound source.

4. The robot cleaner of claim 1, wherein the controller filters out only sounds having a sound pressure equal to or higher than a predetermined level, and determines whether the filtered sounds are abnormal.

5. The robot cleaner of claim 1, further comprising:
   an infrared sensor, wherein when heat having a temperature equal to or higher than a predetermined temperature is sensed by the infrared sensor, the controller operates the at least one image obtaining device to obtain images.

6. The robot cleaner of claim 5, wherein when the sound obtained through the at least one sound obtaining device is determined as being abnormal, the infrared sensor is operated.

7. The robot cleaner of claim 1, wherein the controller processes the images obtained through the at least one image obtaining device, and when a human body image is sensed, the controller determines that a current situation is abnormal.

8. The robot cleaner of claim 1, wherein the controller processes the images obtained through the at least one image obtaining device to sense an animal image, and when a movement change speed of an image is equal to or greater than a predetermined speed, or when a sound pressure of the sound obtained with respect to a subject is equal to or higher than a predetermined level, the controller determines that a current situation is abnormal.

9. The robot cleaner of claim 1, further comprising:
   a communication device configured to transmit an alarm signal to a remote terminal or a server, when the controller determines that a current situation is abnormal.

10. A method for controlling a robot cleaner including a sound database (DB) configured to store various daily life sounds, the method comprising:

obtaining a sound through, at least one sound obtaining device;

determining whether the sound is abnormal;

obtaining images in a direction in which the abnormal sound is generated through at least one image obtaining device; and calculating a similarity between the obtained by the at least one sound obtaining device and sounds stored in the sound DB to determine whether the obtained sound is abnormal.

11. The method of claim 10, further comprising:

sensing a direction in which the abnormal sound is generated.

12. The method of claim 10, further comprising:

moving or rotating via a drive the robot cleaner the direction in which the abnormal sound is generated.

13. A robot cleaner, comprising:

at least one sound obtaining device;

at least one image obtaining device;

an infrared sensor; and a controller configured to determine whether a sound obtained through the at least one sound obtaining device is abnormal, sense a direction in which an abnormal sound is generated, and obtain images in the direction in which the abnormal sound is generated through the at least one image obtaining device, wherein when heat having a temperature equal to or higher than a predetermined temperature is sensed by the infrared sensor, the controller operates the at least one image obtaining device to obtain images.

14. The robot cleaner of claim 13, wherein when the sound obtained through the at least one sound obtaining device is determined as being abnormal, the infrared sensor is operated.

15. A robot cleaner, comprising:

at least one sound obtaining device;

at least one image obtaining device; and a controller configured to determine whether a sound obtained through the at least one sound obtaining device is abnormal, sense a direction in which an abnormal sound is generated, and obtain images in the direction in which the abnormal sound is generated through the at least one image obtaining device, wherein the controller processes the images obtained through the at least one image obtaining device to sense an animal image, and when a movement change speed of an image is equal to or greater than a predetermined speed, or when a sound pressure of the sound obtained with respect to a subject is equal to or higher than a predetermined level, the controller determines that a current situation is abnormal.

* * * * *